US011483713B2

(12) United States Patent
Shimada

(10) Patent No.: US 11,483,713 B2
(45) Date of Patent: Oct. 25, 2022

(54) TERMINAL DEVICE, PERSONAL AUTHENTICATION SYSTEM AND PERSONAL AUTHENTICATION METHOD

(71) Applicant: MAXELL, LTD., Kyoto (JP)

(72) Inventor: Kenichi Shimada, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/769,610

(22) PCT Filed: Dec. 6, 2018

(86) PCT No.: PCT/JP2018/044998
§ 371 (c)(1),
(2) Date: Jun. 4, 2020

(87) PCT Pub. No.: WO2019/124103
PCT Pub. Date: Jun. 27, 2019

(65) Prior Publication Data
US 2020/0322792 A1  Oct. 8, 2020

(30) Foreign Application Priority Data

Dec. 20, 2017  (JP) .............................. JP2017-244152

(51) Int. Cl.
| | |
|---|---|
| *H04W 12/63* | (2021.01) |
| *H04W 4/60* | (2018.01) |
| *H04W 64/00* | (2009.01) |
| *G06F 21/43* | (2013.01) |
| *G06F 21/44* | (2013.01) |
| *H04L 9/40* | (2022.01) |

(Continued)

(52) U.S. Cl.
CPC ............ *H04W 12/63* (2021.01); *G06F 21/43* (2013.01); *G06F 21/44* (2013.01);
(Continued)

(58) Field of Classification Search
CPC ....... H04W 4/00–029; H04W 4/30–38; H04W 80/00; H04L 63/0853
See application file for complete search history.

(56) References Cited

U.S. PATENT DOCUMENTS

| | | | |
|---|---|---|---|
| 9,171,410 B2 | 10/2015 | Yamada | |
| 2012/0209773 A1* | 8/2012 | Ranganathan ..... | G06Q 20/3224 705/44 |

(Continued)

FOREIGN PATENT DOCUMENTS

| | | |
|---|---|---|
| JP | 2004-258845 A | 9/2004 |
| JP | 2010-277190 A | 12/2010 |

(Continued)

OTHER PUBLICATIONS

International Search Report of PCT/JP2018/044998 dated Mar. 12, 2019.

*Primary Examiner* — San Htun
(74) *Attorney, Agent, or Firm* — Mattingly & Malur, PC

(57) ABSTRACT

A technology which is highly safe and furthermore highly convenient in personal authentications via a mobile terminal is provided. A terminal device 200 of the present invention includes: a position determining section 271 that determines a position of the terminal device 200 at predetermined time intervals, and accumulates the position as position information; a movement history generating section 272 that generates a movement history by using the position information accumulated in a predetermined period, and stores the movement history as movement history information; a registration processing section 276 that transmits, for registration, the movement history information to a personal authentication apparatus; and an authentication requesting section 279 that makes an authentication request to the personal authentication apparatus 310 by using the movement history information stored after the transmission by the registration processing section 276 to the personal authentication apparatus 310.

6 Claims, 18 Drawing Sheets

(51) Int. Cl.
*H04W 12/06* (2021.01)
*G06Q 20/38* (2012.01)
*H04W 8/08* (2009.01)

(52) U.S. Cl.
CPC ...... *H04L 63/0853* (2013.01); *H04L 63/0876* (2013.01); *H04W 4/60* (2018.02); *H04W 12/06* (2013.01); *H04W 64/00* (2013.01); *G06Q 20/3821* (2013.01); *H04W 8/08* (2013.01)

(56) References Cited

U.S. PATENT DOCUMENTS

| | | | |
|---|---|---|---|
| 2013/0267228 A1* | 10/2013 | Yanagida | G01S 5/0027 455/435.1 |
| 2014/0221012 A1 | 8/2014 | Uetabira | |
| 2015/0293592 A1* | 10/2015 | Cheong | G06F 3/0416 345/173 |
| 2015/0310434 A1* | 10/2015 | Cheung | H04W 12/06 705/44 |
| 2017/0286648 A1 | 10/2017 | Yamaguchi et al. | |

FOREIGN PATENT DOCUMENTS

| | | |
|---|---|---|
| JP | 2012-133526 A | 7/2012 |
| JP | 2014-149811 A | 8/2014 |
| JP | 2016-045811 A | 4/2016 |
| JP | 2016-099684 A | 5/2016 |
| WO | 2013/073120 A1 | 5/2013 |

\* cited by examiner

| MODEL NAME (411) | SERIAL NO. (412) |
|---|---|
| xxxxxxx | ********** |

| NO. (421) | DATE AND TIME (422) | POSITION (423) |
|---|---|---|
| 1 | 2017.11.24 15:00 | LATITUDE 36°, 0', 0", LONGITUDE 135°, 0', 0" |
| 2 | 2017.11.24 15:01 | LATITUDE 36°, 0', 2", LONGITUDE 135°, 0', 1" |
| 3 | 2017.11.24 15:02 | LATITUDE 36°, 0', 4", LONGITUDE 135°, 0', 2" |
| ⋮ | ⋮ | ⋮ |

| PACE FREQUENCY (431) | STRIDE (432) | WALKING SPEED (433) |
|---|---|---|
| xxx | yyy | zzz |

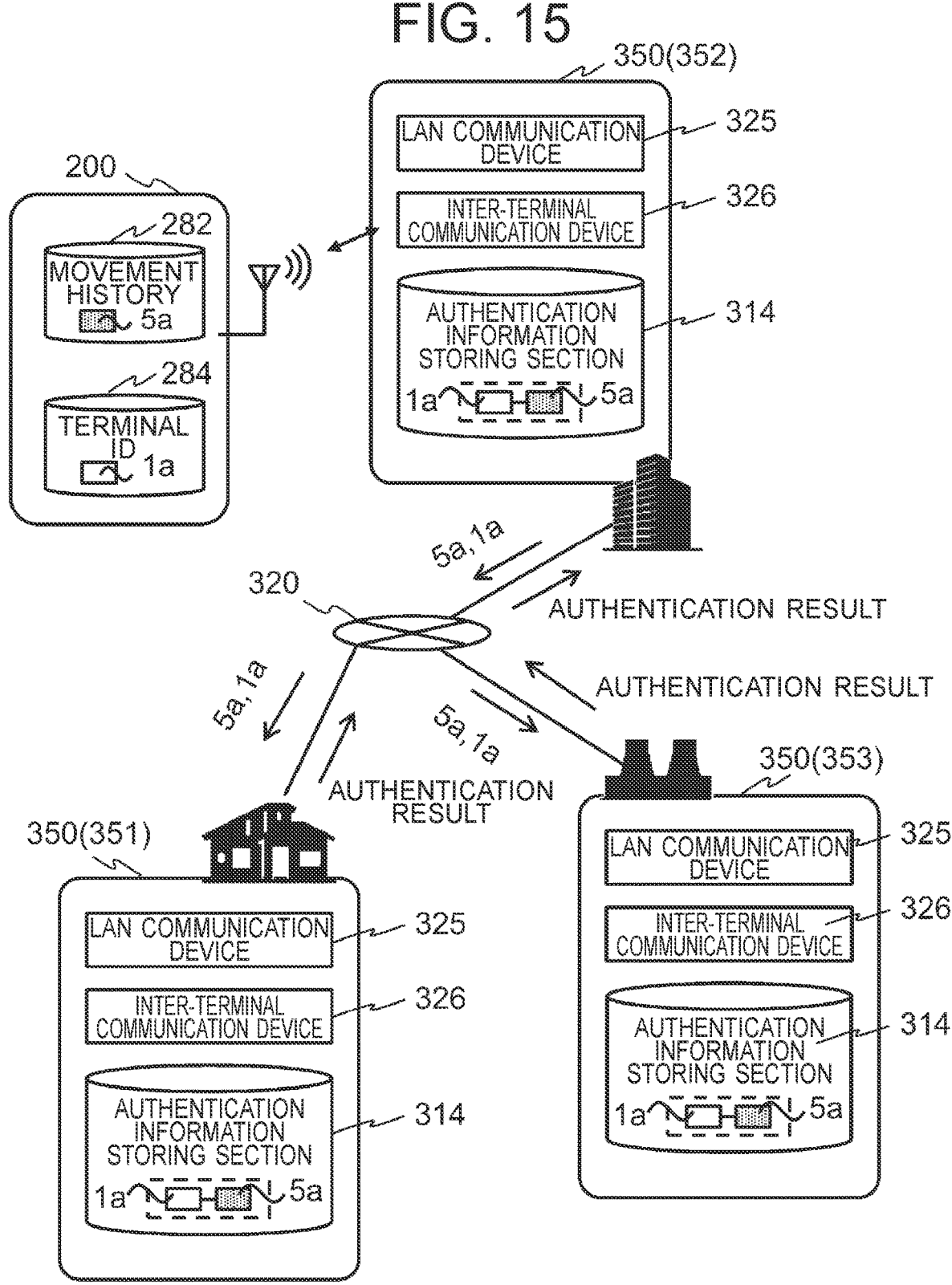

TERMINAL DEVICE, PERSONAL AUTHENTICATION SYSTEM AND PERSONAL AUTHENTICATION METHOD

TECHNICAL FIELD

The present invention relates to a personal authentication technology. In particular, the present invention relates to a technology of performing a personal authentication by using user related history information collected at a terminal possessed by a user.

BACKGROUND ART

There are personal authentication technologies that use position information that can be acquired at mobile terminals. For example, PATENT LITERATURE 1 discloses the following technology: "Current position information of a mobile communication device of a user is received from the mobile communication device, and information related to a movement history of the mobile communication device is collected. Then, an inquiry related to a content of the history is generated, and presented to the user. An answer received from the user, and the content of the history are compared, and if consistency between them is confirmed, the user is determined as an authenticated user (an excerpt from ABSTRACT).

CITATION LIST

Patent Literature

PATENT LITERATURE 1: JP-2014-149811-A

SUMMARY OF INVENTION

Technical Problem

The technology disclosed in PATENT LITERATURE 1 adopts a method in which an inquiry is created on the side of the system, and a user answers, in order to confirm whether movement history information acquired from a terminal is movement history information from the user himself/herself. Since the credentials used for authentications are changed automatically, the technology is highly convenient and highly safe. However, it is necessary for a user to perform button operation when the user selects an answer from choices, requiring the user to perform such a cumbersome task.

The present invention is made in view of the circumstances described above, and an object thereof is to provide a technology which is highly safe and further highly convenient in personal authentications via a mobile terminal.

Solution to Problem

In order to solve the problem described above, the present invention provides a terminal device including: a position determining section that determines a position of the terminal device at predetermined time intervals, and accumulates the position as position information; a movement history generating section that generates a movement history by using the position information accumulated in a predetermined period, and stores the movement history as movement history information; a registration processing section that transmits, for registration, the movement history information to a personal authentication apparatus; and an authentication requesting section that makes an authentication request to the personal authentication apparatus by using the movement history information stored after the transmission by the registration processing section to the personal authentication apparatus.

In addition, the present invention provides a personal authentication system including: a terminal device; an authentication interface apparatus; and a personal authentication apparatus. The terminal device includes: a position determining section that determines a position of the terminal device at predetermined time intervals, and accumulates the position as position information; a movement history generating section that generates a movement history by using the position information accumulated in a predetermined period, and stores the movement history as movement history information; a registration processing section that transmits, for registration, the movement history information to the personal authentication apparatus; and an authentication requesting section that makes an authentication request to the personal authentication apparatus via the authentication interface apparatus by using the movement history information stored after the transmission by the registration processing section to the personal authentication apparatus. The personal authentication apparatus includes: a storage processing section that stores the movement history information transmitted from the terminal device; and an authenticating section that: performs, when the authentication request is received from the terminal device via the authentication interface apparatus, an authentication by judging whether or not the movement history included in the authentication request is stored by the storage processing section; and replies with an authentication result.

The present invention provides a personal authentication method performed at a personal authentication system including: a terminal device; an authentication interface apparatus; and a personal authentication apparatus. The personal authentication method includes: an initial registration step of: storing movement history information at the terminal device; and additionally transmitting the movement history information to the personal authentication apparatus, and storing the movement history information as authentication information at the personal authentication apparatus; an authentication step of: transmitting, to the personal authentication apparatus, the movement history information as an authentication request via the authentication interface apparatus; and being subjected to an authentication by using the authentication information at the personal authentication apparatus; and an authentication information updating step of: transmitting newly generated movement history information to the personal authentication apparatus via the authentication interface apparatus; and replacing the authentication information stored at the personal authentication apparatus with the movement history information.

Advantageous Effects of Invention

According to the present invention, a technology which is highly safe and furthermore highly convenient in personal authentications via a mobile terminal can be provided. Problems, configurations and effects other than those described above become apparent from the following explanations of embodiments.

BRIEF DESCRIPTION OF DRAWINGS

FIG. 10A is an explanatory diagram for explaining the data configuration of a terminal ID in the first embodiment; FIG. 10B is an explanatory diagram for explaining the data configuration of a movement history in the first embodiment; and FIG. 10C is an explanatory diagram for explaining the data configuration of biometric information in the first embodiment, respectively.

FIG. 15 is an explanatory diagram for explaining the flow of data at the time of an authentication in the second embodiment.

DESCRIPTION OF EMBODIMENT

Hereinafter, embodiments of the present invention are explained with reference to the drawings. Hereinafter, in the present specification, those with identical functions are given identical reference signs unless otherwise noted particularly, and repetitive explanations are omitted.

First Embodiment

A first embodiment of the present invention is explained. In a personal authentication system in the present embodiment, a personal authentication is performed by using information of a terminal device such as a mobile terminal or a wearable terminal held by a user. Specifically, position information of the user is collected for a predetermined period, and movement history information (hereinafter, simply called a movement history) is generated from the collected information, and is shared with a personal authentication apparatus (server). Then, this shared movement history is used for the authentication as authentication information. At this time, this movement history is generated from the position information acquired while a valid user is carrying the terminal device. In addition, the authentication information is updated at predetermined timings.

Figure 1:
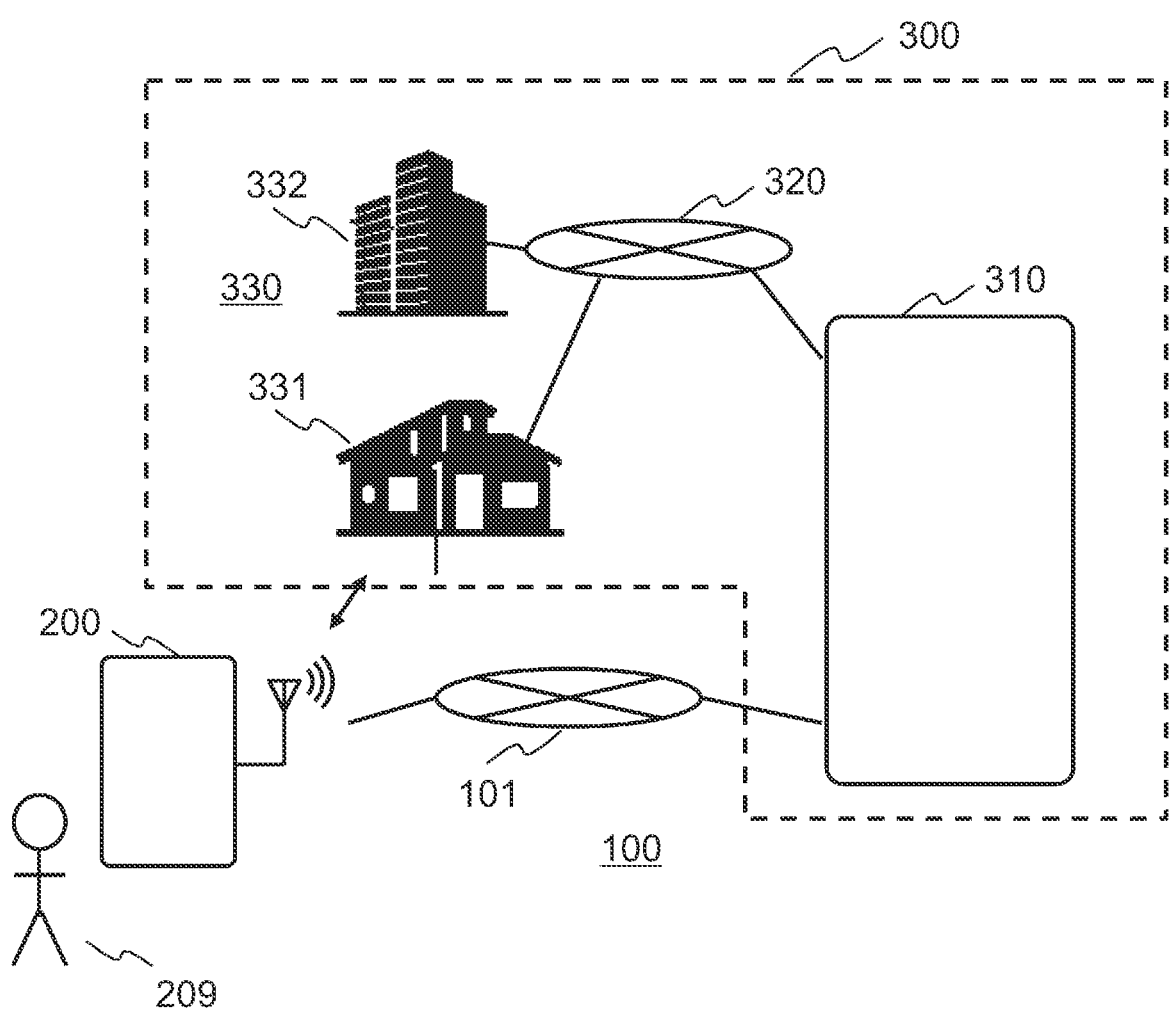
FIG. 1 is an overall configuration diagram of a personal authentication system in a first embodiment.

First, the overall configuration of a personal authentication system 100 in the present embodiment is explained. FIG. 1 is an overall configuration diagram of the personal authentication system 100 in the present embodiment. The personal authentication system 100 includes a terminal device 200 and a provider system 300.

The provider system 300 includes: a personal authentication apparatus 310 that a provider or the like has; a shop device 330 provided at each shop; and an internal network (N/W) 320 that performs data transmission and reception between the personal authentication apparatus 310 and the shop device 330. Note that other than these, although not illustrated, a settlement server and the like may be provided.

In the example illustrated in FIG. 1, two shop devices 330, which are a shop device 331 and a shop device 332, are provided, but the number of the shop device 330 is not limited to this. In addition, hereinafter, unless it is particularly necessary to make a distinction in the present specification, the individual shop devices 331 and 332 are representatively referred to as the shop device 330.

The terminal device 200 and the personal authentication apparatus 310 can transmit and receive data directly through a network 101.

[Hardware Configuration of Terminal Device]

Figure 2:
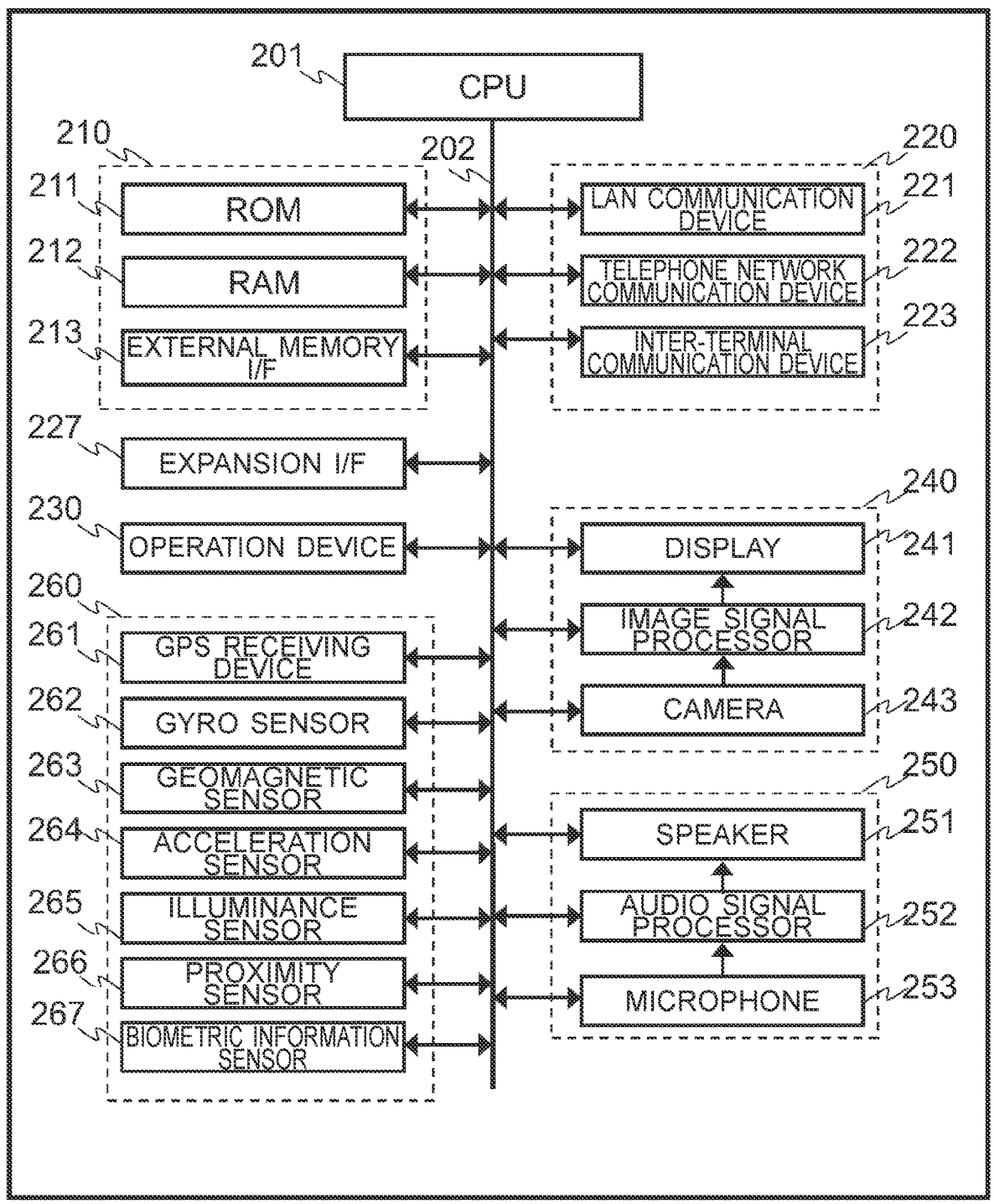
FIG. 2 is a hardware configuration diagram of a terminal device in the first embodiment.

First, the terminal device 200 is explained. The hardware configuration of the terminal device 200 is illustrated in FIG. 2. As illustrated in this figure, the terminal device 200 includes a CPU (Central Processing Unit) 201, a system bus 202, a storage apparatus 210, a communication device 220, an expansion I/F 227, an operation device 230, a video processor 240, an audio processor 250, and a sensor 260.

The CPU 201 is a microprocessor unit that controls the whole terminal device 200. The system bus 202 is a data communication path for performing data transmission and reception between the CPU 201 and each operation block in the terminal device 200.

The storage apparatus 210 includes a ROM (Read Only Memory) 211, a RAM (Random Access Memory) 212, and an external memory interface (I/F) 213.

The ROM 211 is a memory that stores a basic operating program such as an operating system, and other operating programs. As the ROM 211, for example, a rewritable ROM like an EEPROM (Electrically Erasable and Programmable Read Only Memory) or a flash ROM is used. In addition, operation set values of the programs described above, and various types of programs and data required for realizing individual functions in the present embodiment are also stored.

The external memory I/F 213 is an interface that is used for connection with a memory card and other memory media, and performing data transmission and reception.

The RAM 212 is a work area to be used at the time of execution of the basic operating program and other operating programs.

The ROM 211 and the RAM 212 may be configured as a section integrated with the CPU 201.

Note that individual operating programs stored on the ROM 211 can be updated and their functions can be expanded through processes of downloading from individual distribution servers on a network, for example.

The communication device 220 includes a LAN (Local Area Network) communication device 221, a telephone network communication device 222, and an inter-terminal communication device 223.

The LAN communication device 221 is connected to the network 101 via an access point (AP) apparatus through a wireless connection realized by Wi-Fi (registered trademark) or the like, and performs data transmission and reception with other apparatuses on the network 101.

The telephone network communication device 222 is used for making calls and performing data transmission and reception through wireless communication with a base station in a mobile telephone communication network.

The inter-terminal communication device 223 is an I/F that realizes communication between the terminal device 200 and the shop device 330. Communication methods that are used include, for example, near field communication (NFC (Near Field Communication)), Bluetooth (registered trademark), and the like. NFC realizes bidirectional communication between devices equipped with NFC chips at very short distances of several centimeters to approximately about one meter. For example, NFC supports services such as electronic money that use a contactless IC chip mounted on the terminal device 200. Bluetooth (registered trademark) realizes simple information exchange by using radio waves between information devices at distances of several meters to about several dozen meters.

The LAN communication device 221, the telephone network communication device 222, and the inter-terminal communication device 223 each include an encoding circuit, a decoding circuit, an antenna, and the like. In addition, the communication device 220 may further include a communication device that realizes infrared communication and other communication devices.

The expansion I/F 227 is a group of interfaces for expanding functions of the terminal device 200. In the present embodiment, a video/audio I/F, a USB (Universal Serial Bus) I/F, and the like are provided. The video/audio I/F performs: input of video signals/audio signals from external video/audio output devices; output of video signals/audio signals to external video/audio input devices; and the like. The USB I/F is connected with other apparatuses such as a PC (Personal Computer), and performs data transmission and reception. In addition, the USB I/F may establish connections of a keyboard and other USB devices.

The operation device 230 receives an input of an operation instruction to the terminal device 200. In the present embodiment, the operation device 230 includes a touch panel arranged to overlap a display 241, and operation keys which are aligned button switches. Note that the operation device 203 may include only either of them. In addition, operation of the terminal device 200 may be performed by using the keyboard or the like connected to the expansion I/F 227. In addition, a physically separate device connected through wired communication or wireless communication may be used to perform operation of the terminal device 200. In addition, the touch panel function may be implemented at the display 241.

The video processor 240 includes the display 241, an image signal processor 242, and a camera 243.

The display 241 is a display device such as a liquid crystal panel, for example, displays image data processed at the image signal processor 242, and provides the image data to a user of the terminal device 200. The image signal processor 242 includes a video RAM which is not illustrated in the figure, and the display 241 is driven on the basis of image data input to the video RAM. In addition, the image signal processor 242 performs format conversion, a superimposition process of a menu and other OSD (On-Screen Display) signals, or the like, as necessary. The camera 243 is an image capturing apparatus that uses an electronic device such as a CCD (Charge-Coupled Device) or a CMOS (Complementary Metal Oxide Semiconductor) sensor to convert light input through a lens into electric signals, to thereby acquire images of the space around it or a target object as image data.

The audio processor 250 includes a speaker 251, an audio signal processor 252, and a microphone 253. The speaker 251 provides audio signals processed at the audio signal processor 252 to the user of the terminal device 200. The microphone 253 converts the voice of the user and the like into audio data, and inputs the audio data.

The sensor 260 is a sensor group for sensing the state of the terminal device 200. In the present embodiment, the sensor 260 includes, for example, a GPS (Global Positioning System) receiving device 261, a gyro sensor 262, a geomagnetic sensor 263, an acceleration sensor 264, an illuminance sensor 265, a proximity sensor 266, and a biometric information sensor 267.

The GPS receiving device 261 receives signals from a positioning satellite such as a GPS satellite, and calculates position information. The acceleration sensor 264 senses accelerations of the terminal device 200. In the present embodiment, the acceleration sensor 264 senses accelerations in the individual axial directions, x, y, and z, in a device coordinate system set for the terminal device 200. The unit of the sensed values is "G," which is measured relative to the gravitational acceleration (1.0 G is about 9.8 m/s$^2$). The biometric information sensor 267 senses biometric information of a user 209 such as pulse waves or a heart rate, for example.

With this group of sensors, the position, inclination, direction, motion, and ambient brightness of the terminal device 200, biometric information of the user 209, and the like are sensed. In addition, the terminal device 200 may further include other sensors like pressure sensors such as an air pressure sensor. Note that, as mentioned above, position information is acquired by the GPS receiving device 261. However, at places where GPS radio waves are hard to reach or at other places, the position information may be acquired by using position information of a Wi-Fi AP apparatus by the LAN communication device 221, and similarly the position information may be acquired by a position information acquisition method by using position information of a base station, and propagation delays of telephone communication radio waves by the telephone network communication device 222. In addition, this group of sensors does not need to be necessarily provided entirely.

Note that the configuration example of the terminal device 200 illustrated in FIG. 2 also includes a large number of configurations that are not essential for the present embodiment, and the effects in the present embodiment are not impaired even with a configuration not provided with those configurations. In addition, configurations that are not illustrated such as a digital broadcast reception function or an electronic money settlement function may further be added.

[Functional Configuration of Terminal Device]

Next, the functional configuration of the terminal device 200 in the present embodiment is explained. In the explanation here, focus is given to functions related to a personal authentication process in the present embodiment.

Figure 3:
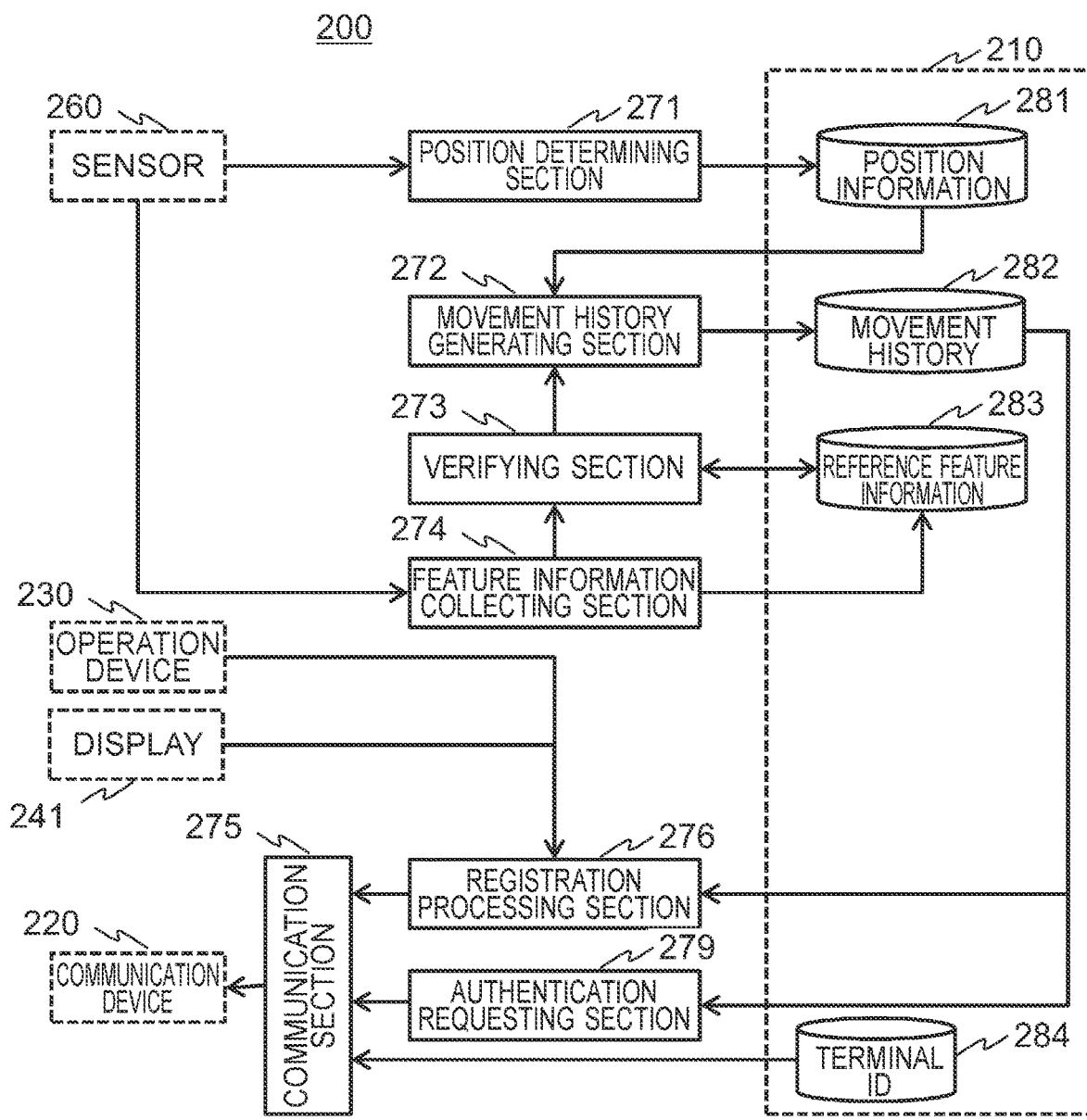
FIG. 3 is a functional block diagram of the terminal device in the first embodiment.

FIG. 3 is a functional block diagram of the terminal device 200 in the present embodiment. The terminal device 200 in the present embodiment includes a position determining section 271, a movement history generating section 272, a verifying section 273, a feature information collecting section 274, a communication section 275, a registration processing section 276, and an authentication requesting section 279. In addition, as sections to be used by the individual sections for executing processes and storing data to be obtained as results of the processes, the terminal device 200 includes a position information storage section 281, a movement history storage section 282, a reference feature information storage section 283, and a terminal ID storage section 284.

The position determining section 271 processes a signal from the sensor 260, and calculates position information of the terminal device 200. The calculated position information is stored in the position information storage section 281. The position information is stored in association with a time at which a signal from the sensor 260 is acquired, for example. In the present embodiment, for example, position information received from the GPS receiving device 261, as the sensor 260, is stored in the position information storage section 281 with no changes being made to the position information. Storage of position information is performed at predetermined time intervals.

The feature information collecting section 274 collects signals from the sensor 260 as feature information of the user 209, and delivers the feature information to the verifying section 273. In addition, as initial processing mentioned below, the feature information collecting section 274 collects the feature information for a predetermined period in accordance with an instruction from the user 209, and stores the feature information in the reference feature information storage section 283 as reference feature information to be used at the time of verification. In the present embodiment, for example, information calculated from an acceleration sensed by the acceleration sensor 264 is used as feature information. In addition, pulse waves, a heart rate, and the like sensed by the biometric information sensor 267 may be used.

Upon reception of feature information from the feature information collecting section 274, the verifying section 273 verifies the feature information with the reference feature information storage section 283, and outputs a result of the verification to the movement history generating section 272.

The movement history generating section 272 generates a movement history by using the position information stored in the position information storage section 281. The movement history information is generated in synchronization with a timing of reception of a result meaning successful verification from the verifying section 273. Details of the generation are mentioned below. The generated movement history is stored in the movement history storage section 282.

The communication section 275 performs data transmission and reception with an external apparatus via the communication device 220. In the present embodiment, a pair of a movement history stored in the movement history storage section 282 and terminal identification information (terminal ID) stored in the terminal ID storage section 284 is transmitted as authentication information at a predetermined timing. In addition, information such as an authentication result is received from the outside. Note that the terminal ID is identification information that uniquely identifies each terminal device 200, and is given in advance to each terminal device 200.

In the present embodiment, authentication information is transmitted to the personal authentication apparatus 310 for registration in some cases, and for authentication in other cases. In a case where transmitted authentication information is transmitted for registration, the registration processing section 276 gives the communication section 275 a notification to that effect.

The communication section 275 receives a notification, and in a case where transmission is for registration, generates header information such that it can be judged that the transmission is for registration, and adds the header information to transmitted data. Hereinafter, authentication information transmitted for registration is called registration authentication information. Note that the registration processing section 276 judges whether or not transmission is for registration on the basis of a transmission timing or an instruction from the user 209 given via the operation device 230 or the display 241.

Note that in a case where transmission is not for registration, that is, in a case where the transmission is for authentication, the registration processing section 276 may give the communication section 275 a notification to that effect or may not notify the communication section 275 at all.

The authentication requesting section 279 makes an authentication request to the personal authentication apparatus 310 via the shop device 330 by using a movement history stored in the movement history storage section 282. Execution of the authentication request is triggered by the start of inter-terminal communication with the shop device 330, for example.

These individual functions are realized by the CPU 201 loading a program stored in advance on the ROM 211 onto the RAM 212, and executing the program. In addition, the position information storage section 281, the movement history storage section 282, the reference feature information storage section 283, and the terminal ID storage section 284 are provided in the ROM 211 or an external memory or the like, for example. In addition, data required for execution of the individual functions, intermediate data generated during the execution, and data generated as results of the execution are also stored on the ROM 211 or an external memory or the like.

[Authenticated User Authenticating Apparatus]

Next, the hardware configuration and functional blocks of the personal authentication apparatus 310 are explained.

Figure 4A:
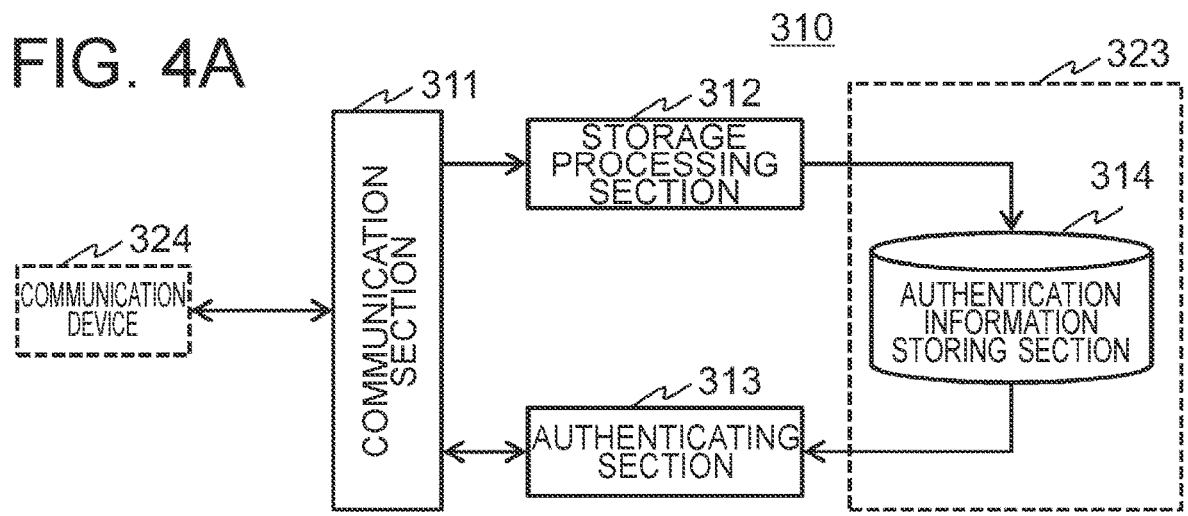
FIGS. 4A and 4B are a functional block diagram and a hardware configuration diagram of a personal authentication apparatus in the first embodiment, respectively.

FIG. 4A is a functional block diagram of the personal authentication apparatus 310. As illustrated in this figure, the personal authentication apparatus 310 includes a communication section 311, a storage processing section 312, and an authenticating section 313. In addition, the personal authentication apparatus 310 further includes an authentication information storing section 314 that stores authentication information.

Figure 4B:
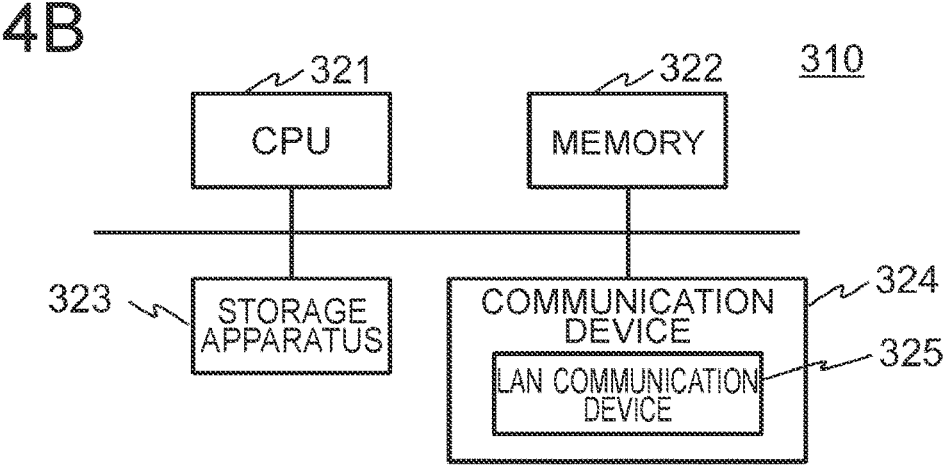

FIG. 4B is a hardware configuration diagram of the personal authentication apparatus 310. The personal authentication apparatus 310 is an information processing apparatus including a CPU 321, a memory 322, a storage apparatus 323, and a communication device 324. In the present embodiment, the personal authentication apparatus 310 includes a LAN communication device 325, for example, as the communication device 324. The LAN communication device 325 realizes communication via the internal network 320 and the network 101.

The communication section 311 controls data transmission and reception with an external apparatus via the communication device 324. In addition, in the present embodiment, the communication section 311 judges whether or not received authentication information is registration authentication information. The judgement is performed on the basis of header information of the received data. Then, in a case where the received data is judged as registration authentication information, the communication section 311 delivers the received data to the storage processing section 312. In addition, in other cases, the communication section 311 delivers the received data to the authenticating section 313.

The storage processing section 312 stores registration authentication information, that is, a pair of a movement history and a terminal ID, transmitted from each terminal device 200, as authentication information in the authentication information storing section 314.

Upon reception of an authentication request from the shop device 330 via the communication section 311, the authenticating section 313 performs an authentication, and replies to the requester shop device 330 with an authentication result. In the present embodiment, as an authentication request, a pair of a movement history and a terminal ID is received from the shop device 330. The authenticating section 313 performs an authentication by verifying the received pair of the movement history and the terminal ID against authentication information stored in the authentication information storing section 314. In a case where they match, the authentication may be successful, and in a case where they do not match, the authentication may fail.

Individual functions of the personal authentication apparatus 310 are realized by the CPU 321 loading a program stored in the storage apparatus 323 onto the memory 322, and executing the program. In addition, the authentication information storing section 314 is provided in the storage apparatus 323 or the like, for example.

[Shop Device]

Figure 4C:
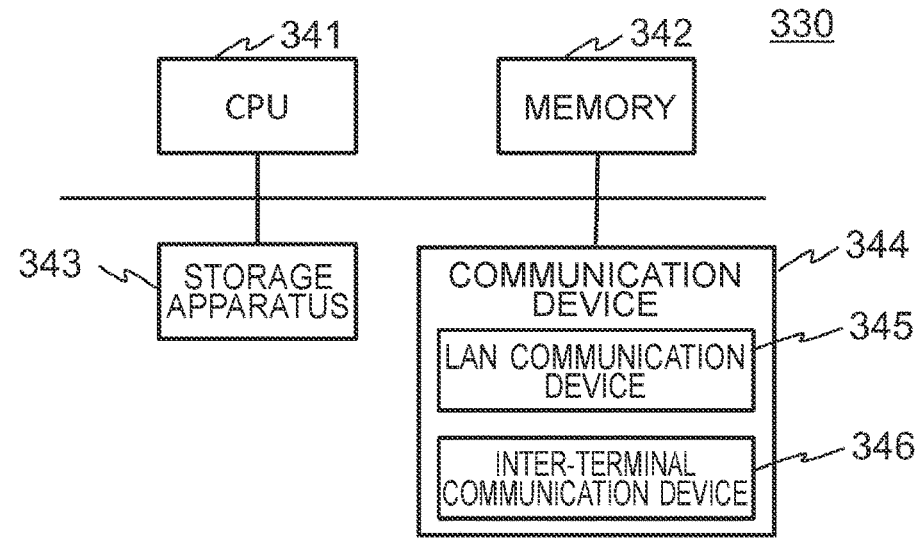
FIG. 4C is a hardware configuration diagram of a shop device in the first embodiment.

Next, the shop device 330 provided at a shop in the present embodiment is explained. Upon reception of authentication information as an authentication request from the terminal device 200, the shop device 330 in the present embodiment transmits the authentication information to the personal authentication apparatus 310, and is subjected to an authentication. As illustrated in FIG. 4C, the shop device 330 is constituted of an information processing apparatus including a CPU 341, a memory 342, a storage apparatus 343, and a communication device 344. The communication device 344 includes a LAN communication device 345 and an inter-terminal communication device 346.

The LAN communication device 340 realizes communication with the personal authentication apparatus 310 via the internal network 320. In addition, the inter-terminal communication device 346 realizes data transmission and reception between the shop device 330 and the terminal device 200.

[Authenticated User Authentication Process]

Figure 5A:
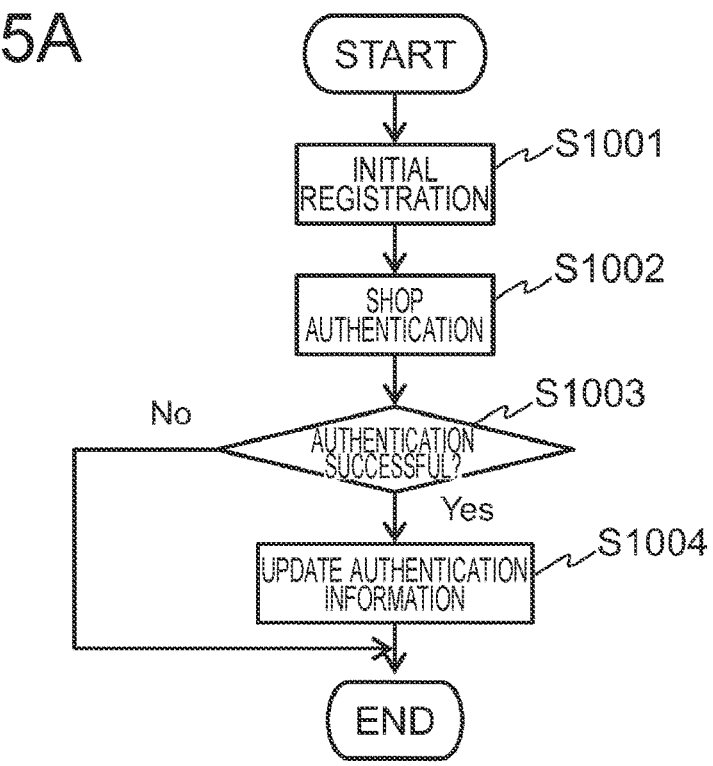
FIG. 5A is a flowchart of a personal authentication process in the first embodiment.

Next, the flow of the personal authentication process in the present embodiment is explained. FIG. 5A is an outline figure of the flow of the personal authentication process in the present embodiment.

As illustrated in this figure, in the personal authentication process, an initial registration process is performed (Step S1001), and thereafter the terminal device 200 is subjected to an authentication as a shop authentication process (Step S1002) via the shop device 330 at a shop or the like. In a case where the authentication is successful in the shop authentication process (Step S1003; Yes), an authentication information updating process of updating authentication information is performed (Step S1004). Note that in a case where the authentication failed at Step S1003, for example, the terminal device 200 gives the user 209 a notification to that effect, and ends the process. Hereinafter, details of individual processes are explained.

Figure 5B:
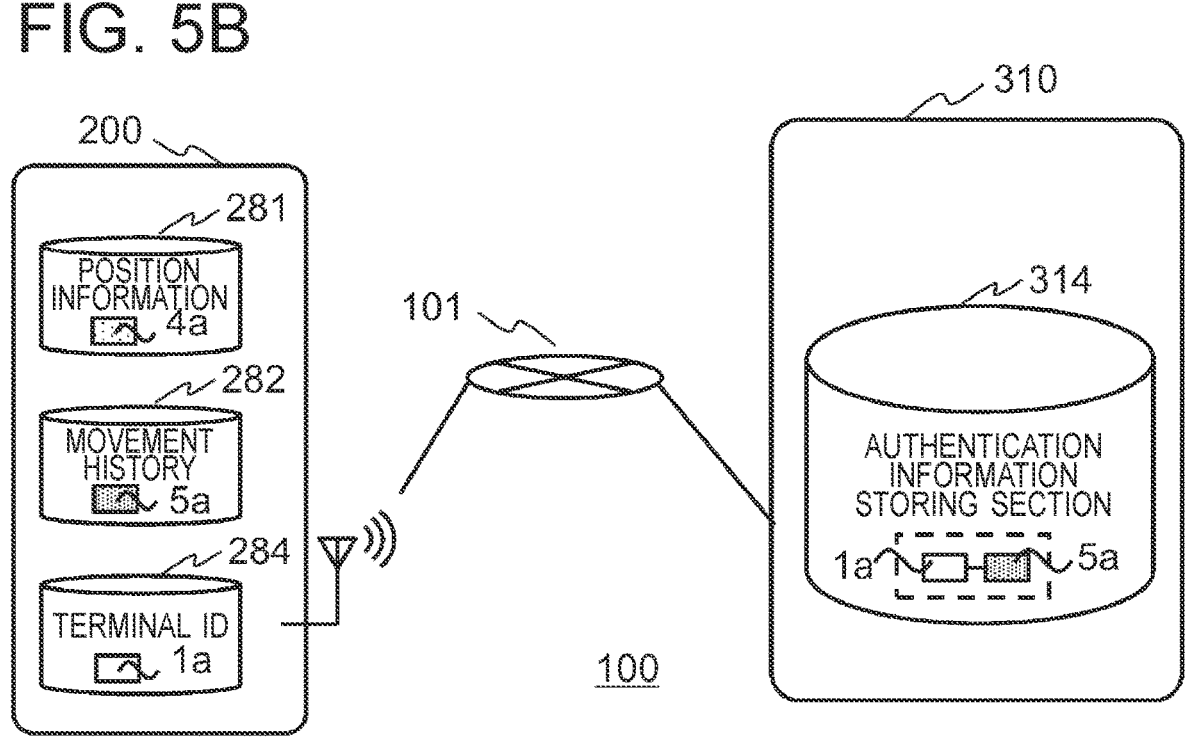
FIG. 5B is an explanatory diagram for explaining an initial registration process in the first embodiment.

The initial registration process is a process of registering authentication information from the terminal device 200 with the personal authentication apparatus 310 as illustrated in FIG. 5B. The initial registration process is executed before the authentication process is performed. As illustrated in this figure, first, at the terminal device 200, the movement history generating section 272 generates a movement history 5a from position information 4a stored in the position information storage section 281. Then, in accordance with an instruction of the registration processing section 276, a pair of the generated movement history 5a and a terminal ID 1a is transmitted as registration authentication information to the personal authentication apparatus 310 via the network 101.

At the personal authentication apparatus 310 having received the registration authentication information, the storage processing section 312 registers, as authentication information, the movement history 5a and the terminal ID 1a in association with each other with the authentication information storing section 314.

Note that after completion of the initial registration, unless the user 209 gives an instruction to stop, the position determining section 271 continues collection of position information.

Figure 6A:
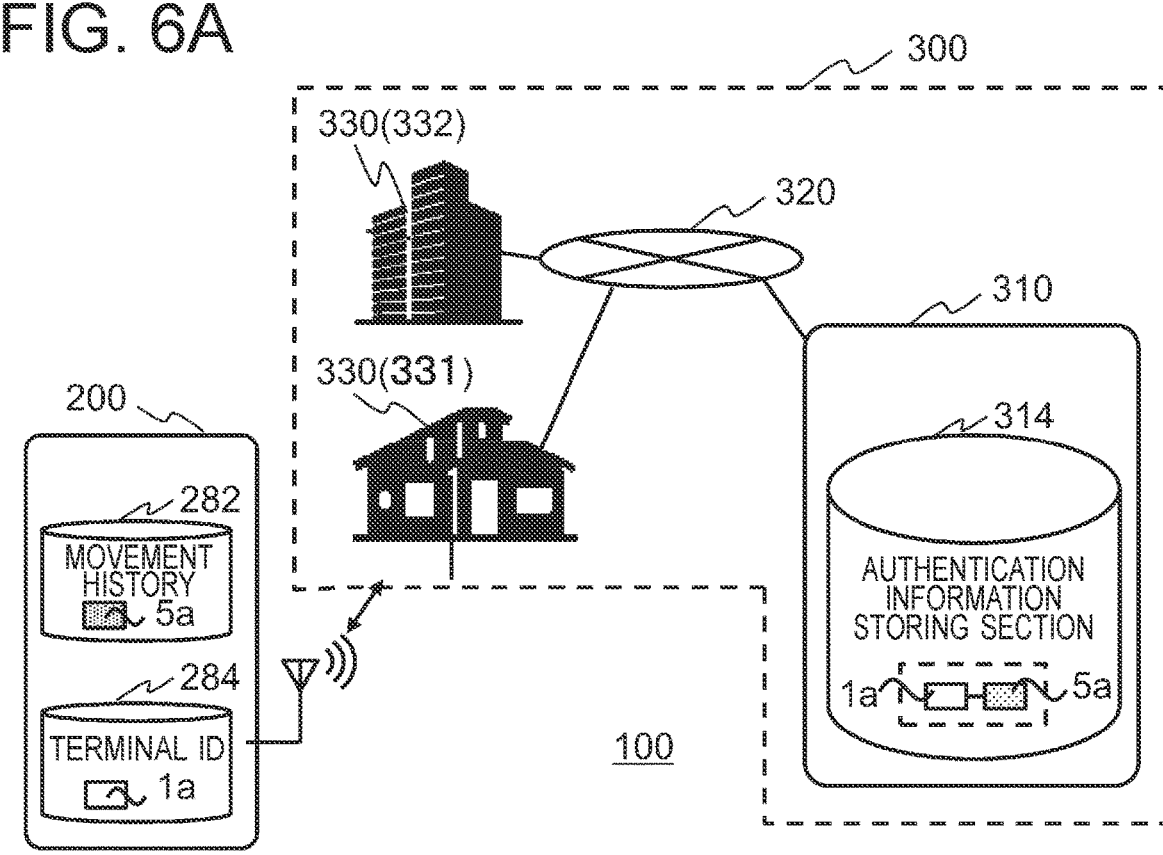
FIG. 6A is an explanatory diagram for explaining a shop authentication process in the first embodiment.

As illustrated in FIG. 6A, the shop authentication process is a process in which the user 209 is subjected to an authentication at the shop device 330 (331) provided at a shop or the like. The user 209 requests an authentication by holding the terminal device 200, for which the initial registration process has been performed in advance, over the shop device 331 or the like. Here, the authentication requesting section 279 transmits, as authentication information, the movement history 5a and the terminal ID 1a to the shop device 331. The transmission is performed by using inter-terminal communication such as near field communication, for example.

Upon reception of the authentication information, the communication device 344 of the shop device 331 transfers the authentication information to the personal authentication apparatus 310 via the internal network 320. Then, at the personal authentication apparatus 310, the authenticating section 313 performs an authentication by using the authentication information registered with the authentication information storing section 314, and replies with a result to the shop device 331. In addition, the shop device 331 replies with a result of the authentication to the sender terminal device 200.

The authentication information updating process is a process of updating the authentication information stored in the personal authentication apparatus 310 in a case where the authentication via the shop device 331 is successful. Here, a new movement history 5b is generated by using position information 4b collected up to that point. Then, along with the terminal ID 1a, the new movement history 5b is transmitted to the personal authentication apparatus 310 as new registration authentication information via the shop device 331, and the authentication information is updated.

Figure 6B:
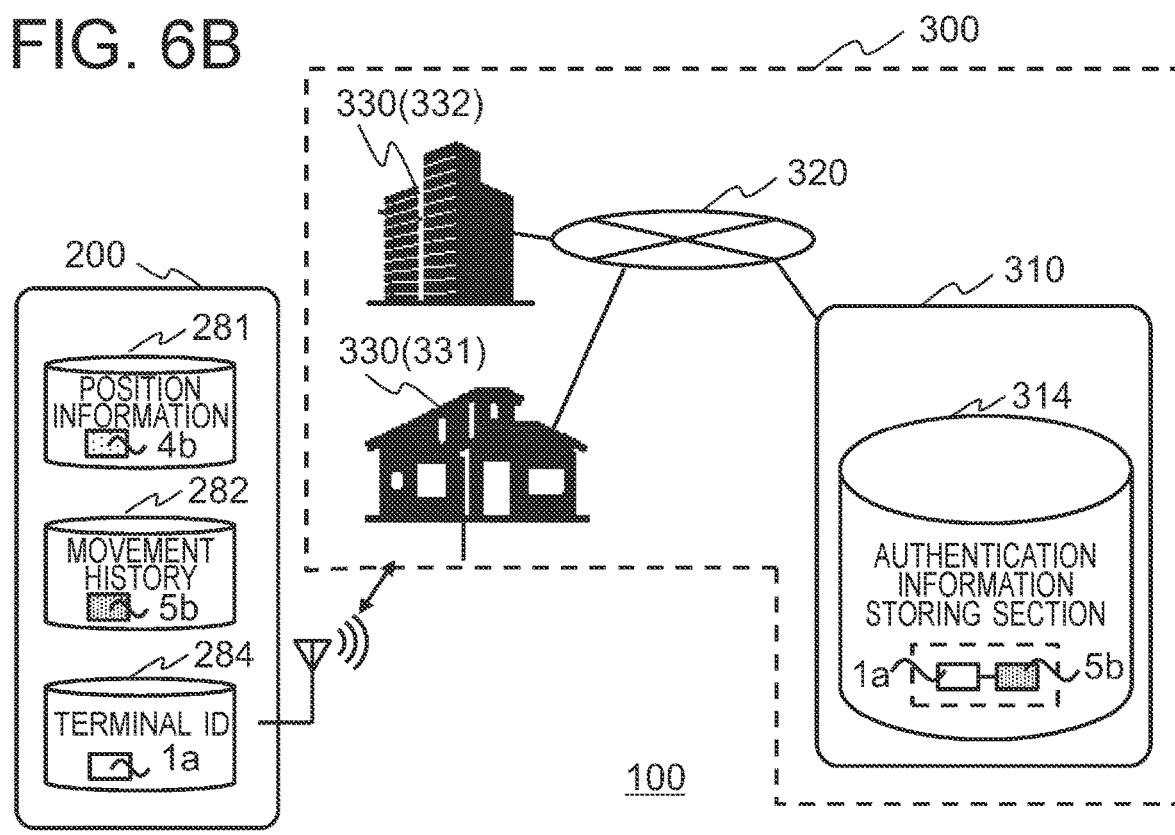
FIG. 6B is an explanatory diagram for explaining an authentication information updating process in the first embodiment, respectively.

As illustrated in FIG. 6B, first, at the terminal device 200, the movement history generating section 272 generates the movement history 5b from the position information 4b stored in the position information storage section 281. Then, in accordance with an instruction of the registration processing section 276, a pair of the generated movement history 5b and the terminal ID 1a is transmitted as the new registration authentication information to the shop device 331. The transmission is performed through inter-terminal communication, for example.

Note that in a case where the new movement history 5b is transmitted via the same shop device 330 after an authentication succeeded in this manner, the registration processing section 276 concludes that the transmission is for registration, and gives the communication section 275 a notification to that effect.

The shop device 331 transmits the received new registration authentication information to the personal authentication apparatus 310 via the internal network 320.

At the personal authentication apparatus 310 having received the registration authentication information, the storage processing section 312 updates the authentication information by registering, as authentication information, the movement history 5b and the terminal ID 1a in association with each other with the authentication information storing section 314. For example, the storage processing section 312 extracts the authentication information registered in association with the same terminal ID 1a, and replaces the extracted authentication information with the newly transmitted authentication information.

Figure 7A:
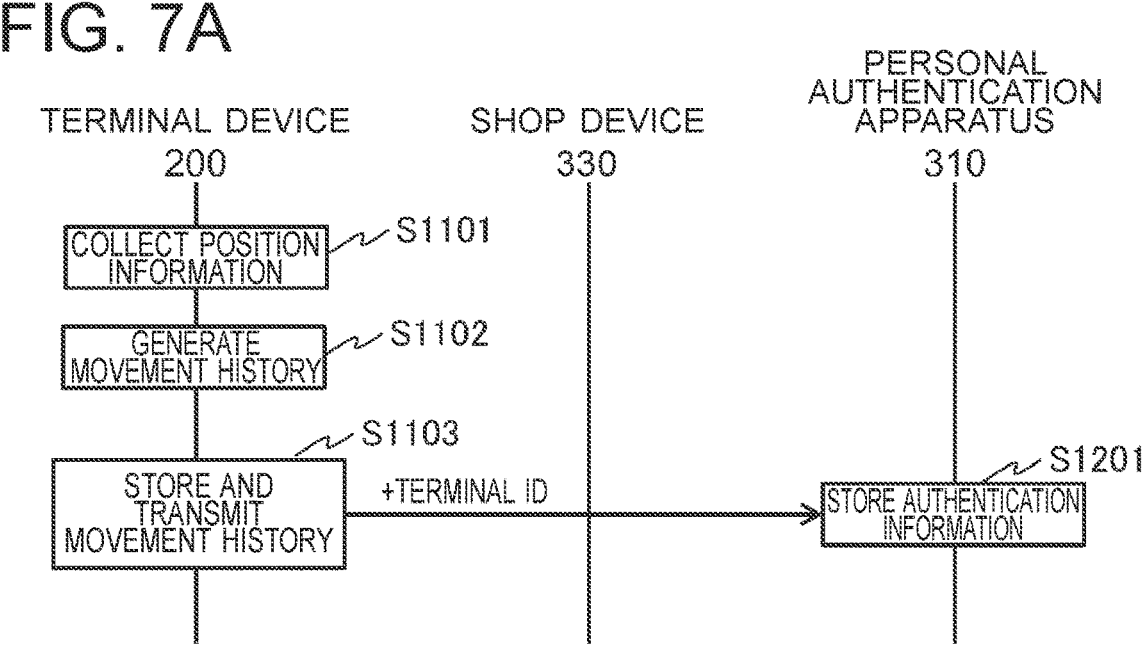
FIG. 7A is a flowchart of a initial registration process in the first embodiment.

The process flow of the initial registration process is illustrated in FIG. 7A.

The position determining section 271 keeps the position information 4a collected for a predetermined period (Step S1101), and stores the position information 4a in the position information storage section 281.

Then, the movement history generating section 272 generates the movement history 5a from the generated position information 4a (Step S1102), and stores the movement history 5a in the movement history storage section 282.

In accordance with an instruction from the user 209, the registration processing section 276 causes the communication section 275 to transmit, to the personal authentication apparatus 310, the movement history 5a as registration authentication information along with the terminal ID 1a (Step S1103). At this time, the communication section 275 adds, to the transmitted data, header information indicating that the transmitted data is registration authentication information.

At the personal authentication apparatus 310, the storage processing section 312 stores, in the authentication information storing section 314, the received registration authentication information (the movement history 5a and the terminal ID 1a) (Step S1201).

Figure 7B:
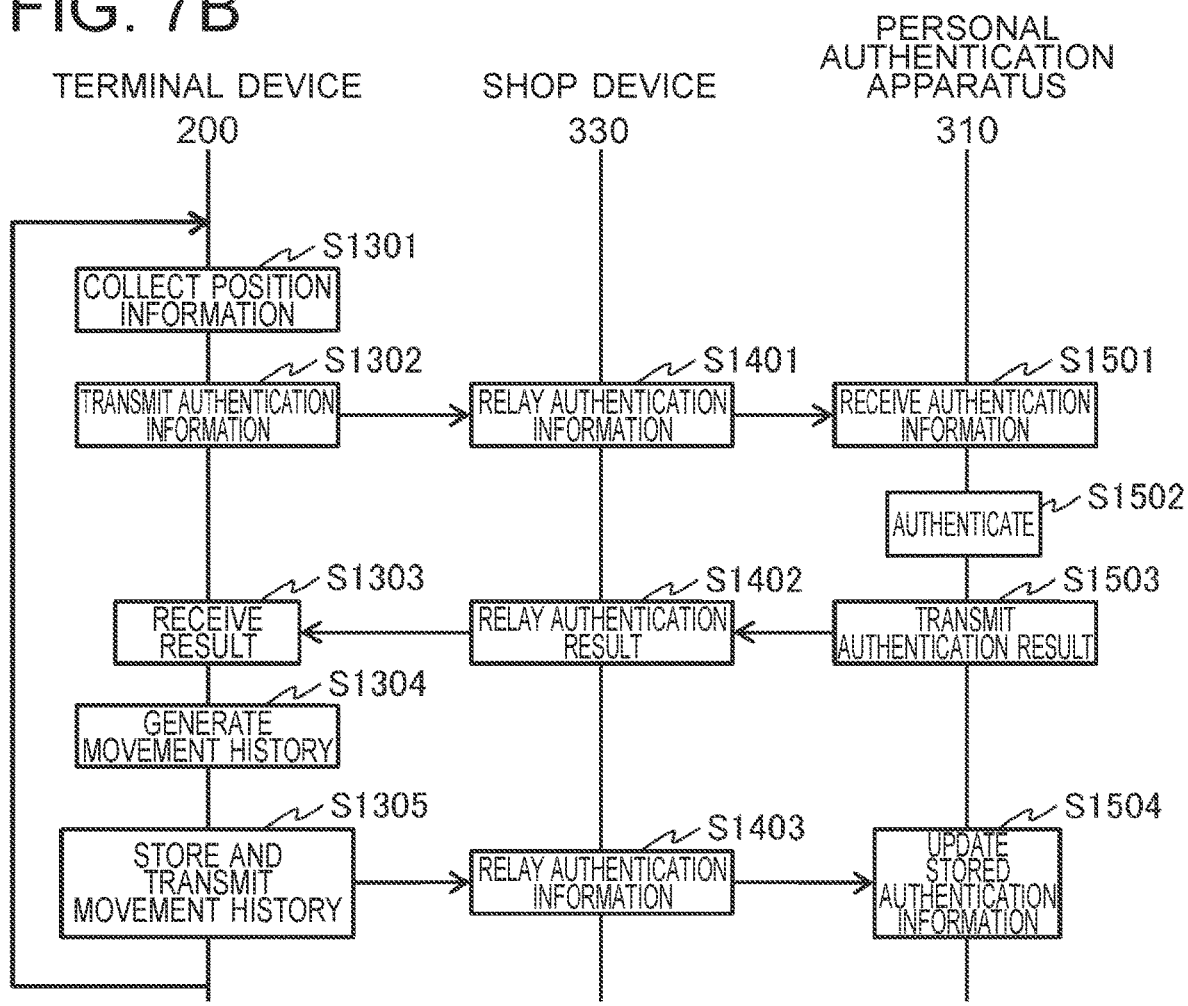
FIG. 7B is a flowchart of the shop authentication process and the authentication information updating process in the first embodiment, respectively.

The process flow of the shop authentication process and the authentication information updating process is illustrated in FIG. 7B.

As mentioned above, the position determining section 271 continues collection of the position information 4b (Step S1301).

Independent of the collection of the position information 4b, upon the arrival of the user 209 at a shop, the authentication requesting section 279 transmits the authentication information (the movement history 5a and the terminal ID 1a) from the terminal device 200 to the shop device 330 (Step S1302). Here, the transmitted movement history 5a is data stored in the movement history storage section 282 at the time of the initial registration. In addition, the transmission is performed by using the inter-terminal communication device 223, for example.

At the shop device 330, the authentication information (the movement history 5a and the terminal ID 1a) is received via the inter-terminal communication device 346, and is transmitted to the personal authentication apparatus 310 via the LAN communication device 345 (Step S1401). The transmission from the shop device 330 to the personal authentication apparatus 310 is performed via the internal network 320, for example.

Upon reception of the authentication information (the movement history 5a and the terminal ID 1a) from the shop device 330 (Step S1501), at the personal authentication apparatus 310, the authenticating section 313 performs an authentication by verifying the authentication information against the authentication information stored in the authentication information storing section 314 (Step S1502).

Then, a result of the authentication is transmitted to the shop device 330 via the communication section 311 (Step S1503). The transmitted authentication result indicates either that the authentication is successful or that the authentication failed.

Upon reception of the authentication result, at the shop device 330, the authentication result is transmitted to the terminal device (Step S1402).

The terminal device 200 receives the authentication result (Step S1303). Here, if the authentication is successful, the terminal device 200 proceeds to a settlement process or the like, for example. On the other hand, if the authentication failed, a notification to that effect is given to the user. The notification to the user is given by displaying a message on the display 241 or by other means, for example.

Next, at the terminal device 200, in a case where the result received at Step S1303 indicates that the authentication is successful, the movement history generating section 272 uses the position information 4b collected up to that time point to generate the movement history 5b (Step S1304). Then, the newly generated movement history 5b is stored in the movement history storage section 282, and additionally is transmitted to the shop device 330 (Step S1305). Along with the terminal ID 1a, the movement history 5b is transmitted as new registration authentication information to the shop device 330. The transmission is performed via the inter-terminal communication devices 223 and 246.

At the shop device 330, the received new registration authentication information (the movement history 5b and the terminal ID 1a) is transmitted to the personal authentication apparatus 310 (Step S1403).

At the personal authentication apparatus 310, the storage processing section 312 updates the authentication information stored in the authentication information storing section 314 with the newly received registration authentication information (Step S1504). At this time, the storage processing section 312 extracts the authentication information having the same terminal ID 1a, and replaces (overwrites) the authentication information with the newly transmitted authentication information.

Thereafter, the terminal device 200 returns to the Step S1301, and continues collection of position information.

The flows of data in the initial registration process, the shop authentication process, and the authentication information updating process that are described above are illustrated in FIG. 8A to FIG. 8C.

Figure 8A:
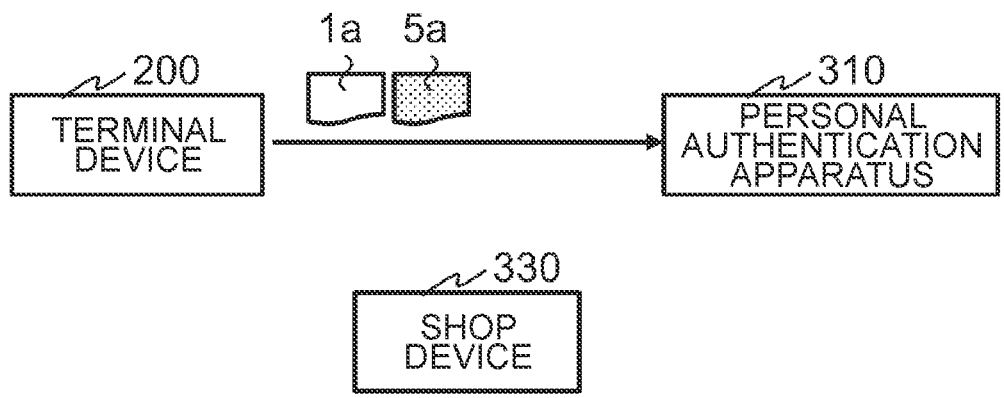
FIGS. 8A to 8C are explanatory diagrams for explaining the flows of data in the initial registration process, the shop authentication process, and the authentication information updating process in the first embodiment, respectively.

As illustrated in FIG. 8A, in the initial registration process, the registration authentication information (the movement history 5a and the terminal ID 1a) is transmitted directly to the personal authentication apparatus 310.

Figure 8B:
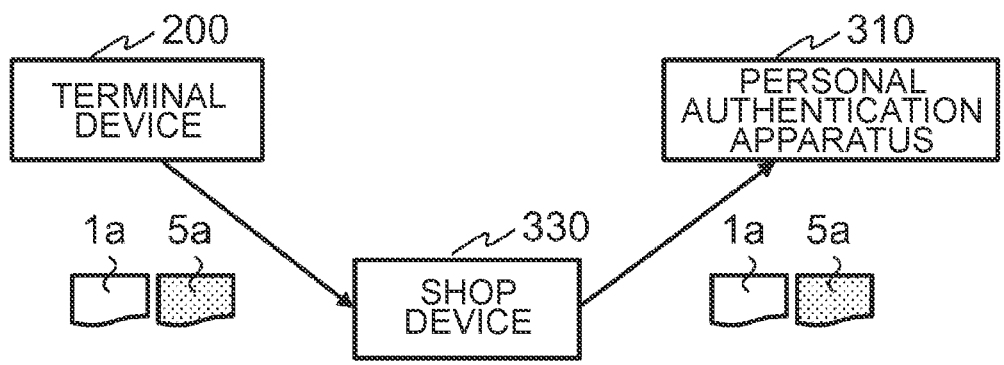
Figure 8C:
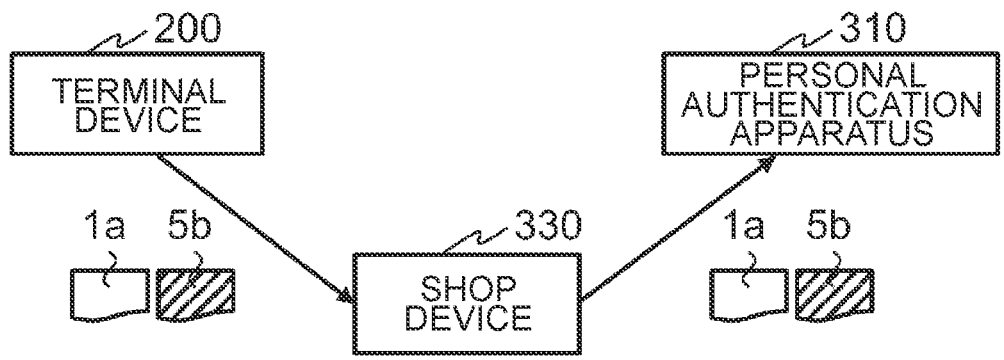

In the processes after the initial registration process, that is, in the shop authentication process and the authentication information updating process, as illustrated in FIG. 8B and FIG. 8C, the authentication information (the movement history 5a and the terminal ID 1a) or the registration authentication information (the movement history 5b and the terminal ID 1a) are transmitted to the personal authentication apparatus 310 via the shop device 330.

The personal authentication process in the present embodiment is explained by using FIG. 9A to FIG. 9D along the motion of the user 209. Individual stores may be provided with shop devices 331, 332, 333, and 334.

Figure 9A:
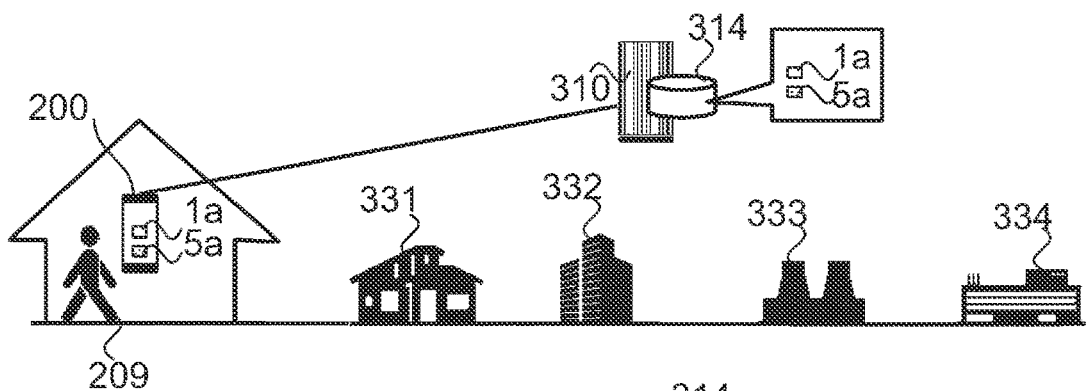
FIGS. 9A to 9D which are explanatory diagrams each for explaining the personal authentication process in the first embodiment.

First, before performing the personal authentication process in the present embodiment at a shop or the like, the user 209 performs the initial registration process as illustrated in FIG. 9A. The initial registration process is performed at the house of the user 209 or the like, for example.

Figure 9B:
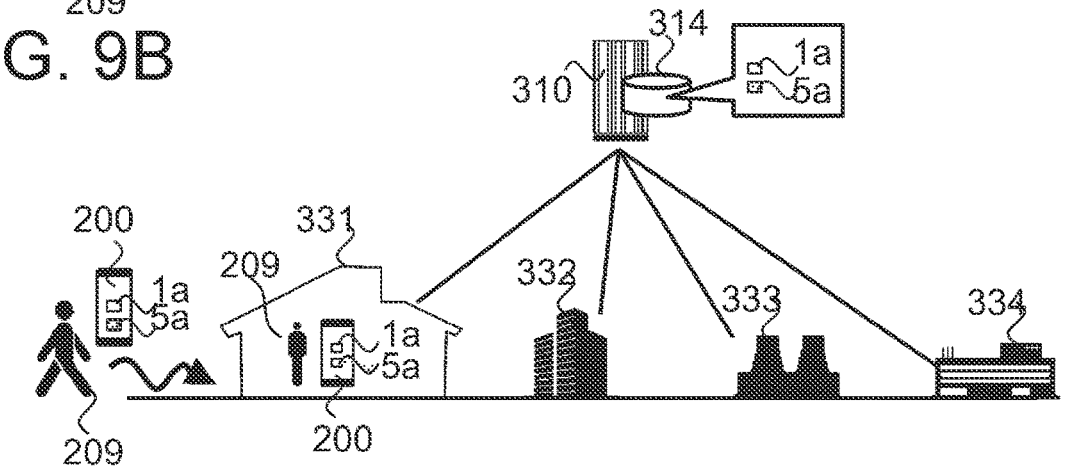

After completing the initial registration process, as illustrated in FIG. 9B, the user 209 carries the terminal device 200, for which the initial registration process has been performed, and heads for a shop. Then, the user 209 holds the terminal device 200 over the shop device 331 or performs other actions. Thereby, the terminal device 200 transmits, as authentication information, the movement history 5a and the terminal ID 1a that are stored in the terminal device 200 to the shop device 331, and requests an authentication.

Note that as illustrated in FIG. 9B, collection of position information is continued while the user 209 is on the way to a shop where the terminal device 200 is to be subjected to an authentication.

Figure 9C:
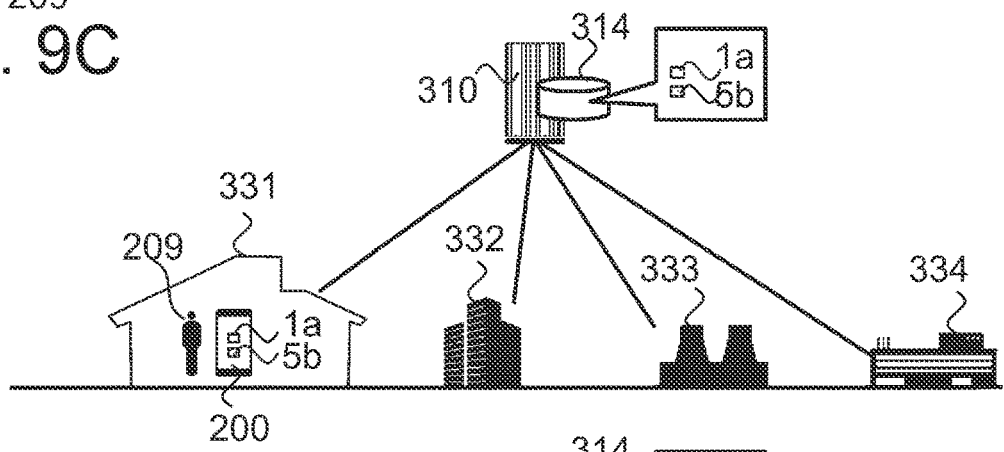

The shop device 331 transmits the authentication information to the personal authentication apparatus 310, and the authentication information is subjected to an authentication. If the authentication is successful, as illustrated in FIG. 9C, the terminal device 200 generates the new movement history 5b from the position information accumulated after previous generation of the movement history. Then, the terminal device 200 stores the new movement history 5b in the movement history storage section 282 of the terminal device 200, and additionally transmits the new movement history 5b as registration authentication information to the shop device 331 along with the terminal ID 1a.

At the shop device 331, the new registration authentication information (the movement history 5b and the terminal ID 1a) is transferred to the personal authentication apparatus 310. Then, at the personal authentication apparatus 310, the authentication information registered in association with the terminal ID 1a is updated.

Figure 9D:
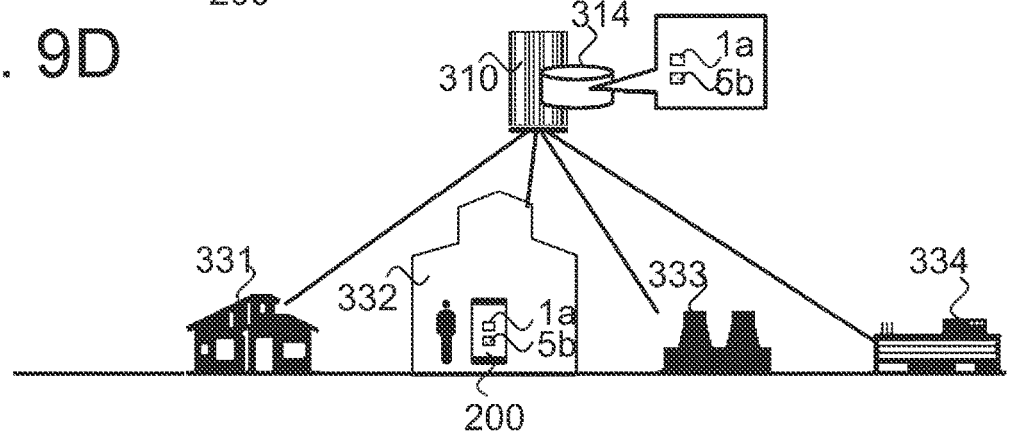

Thereafter, in a case where the user 209 visits another shop, at the shop device 332 of the shop, the user 209 makes an authentication request, and performs updating of the authentication information and the like by using the movement history 5b newly stored in the movement history storage section 282, as illustrated in FIG. 9D.

Note that before the shop authentication process, the authentication requesting section 279 may perform a process of confirming the validity of the user 209. That is, the terminal device 200 further includes an authenticated user confirming section, confirms at the authenticated user confirming section whether or not the user 209 is the preregistered user 209 himself/herself, and, after confirming that the user 209 is the authenticated user, performs the shop authentication process.

The confirmation of the authenticated user by the authenticated user confirming section in this case may make use of biometric information such as fingerprints, for example. In addition, the confirmation may make use of knowledge information such as passwords.

In addition, although in the example described above, the terminal device 200 generates a movement history after receiving an authentication result, the timing of the generation of a movement history is not limited to this. The generation of a movement history may be performed independently of an authentication process. For example, as mentioned below, in a possible configuration, the validity of position information is judged every time position information is collected, and if position information is valid, the position information is accumulated as movement information.

In this case, as authentication information, the movement history having been registered with the personal authentication apparatus 310 and the movement history (movement history for updating) that has been newly generated and is to be registered next are stored in the movement history storage section 282 in such a manner that they can be distinguished from each other.

[Data Configuration]

Here, the configuration of data transmitted from the terminal device 200 to the personal authentication apparatus 310 and the shop device 330 is explained.

A data configuration example of the terminal ID 1a is illustrated in FIG. 10A. As illustrated in this figure, the terminal ID 1a includes model name information 411 identifying the model of the terminal, and a serial number 412. Note that the terminal ID 1a is not limited to this. The terminal ID 1a can be any information as long as the information can uniquely identify each terminal device 200. In addition, the terminal ID 1a may be inserted to transmitted data as header information, for example.

A data configuration example of the movement history 5a is illustrated in FIG. 10B. The movement history 5a may be time series data of position information indicating positions determined in a predetermined period, for example. That is, the movement history 5a includes a predetermined number of pieces of position information. As illustrated in this figure, for each piece of position information, the movement history 5a includes a number 421 identifying the piece of position information, a date and time 422 at which the piece of position information is acquired, and the piece of position information 423.

Note that the movement history 5a is not limited to this. For example, a hash value of each piece of position information may be computed, and the movement history 5a may be time series data of such hash values. In addition, from the perspective of privacy protection, transitions of position information indicating determined positions may be reordered in accordance with a predetermined rule, and the reordered transitions may be treated as a movement history.

[Movement History Generation Process]

Here, the movement history generation process in the present embodiment is explained. In the present embodiment, the movement history generating section 272 generates a movement history from position information collected by the position determining section 271 in a predetermined period. At this time, in the present embodiment, only position information collected while the valid user 209 of the terminal device 200 is carrying the terminal device 200 is adopted for the generation of a movement history.

In the present embodiment, it is judged whether or not a user is the valid user 209 by using preregistered feature information of the user 209. In the present embodiment, as the feature information, for example, information related to walking such as the pace frequency, stride, or walking speed of the user is used. These types of information are calculated from acceleration information in a predetermined period acquired at the acceleration sensor 264, for example.

The pace is estimated from changes in the waveform of the acceleration at the time of walking of the user 209. In addition, the stride is estimated by using, in combination, the estimated pace, and position information acquired by the position determining section 271.

Figure 11A:
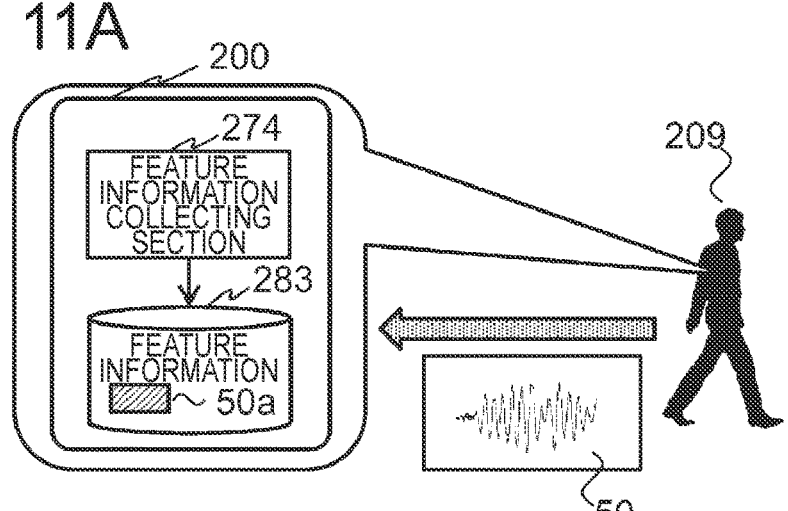
FIG. 11A to FIG. 11D are explanatory diagrams for explaining a movement history generation process that uses feature information in the first embodiment.
Figure 11B:
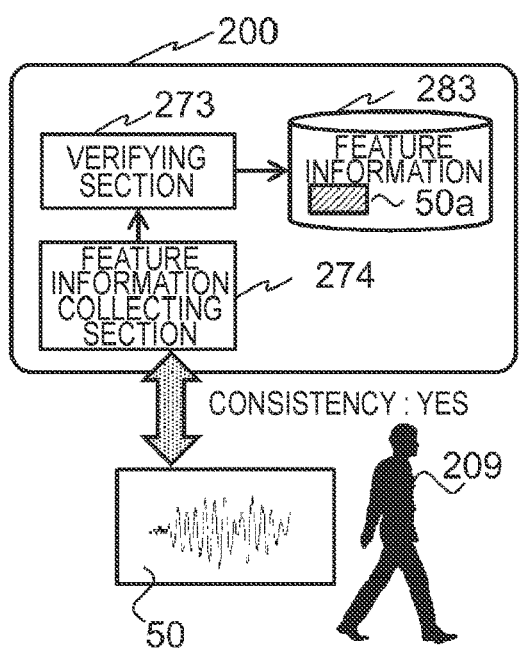
Figure 11C:
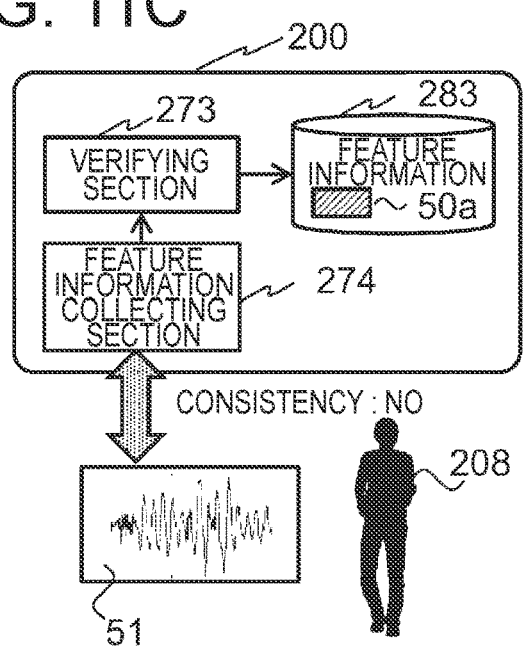

The outline of the movement history generation process by using feature information in the present embodiment is explained by using FIG. 11A to FIG. 11C.

In the present embodiment, as illustrated in FIG. 11A, first as the initial processing, the feature information collecting section 274 collects predetermined feature information, and registers the feature information with the reference feature information storage section 283 as reference feature information 50a to be used at the time of verification.

Here, the data configuration of the reference feature information 50a to be registered is illustrated in FIG. 10C. As illustrated in this figure, the reference feature information 50a includes a pace frequency 431, a stride 432, and a walking speed 433, for example. Note that the reference feature information 50a may be waveform data itself, for example.

After the reference feature information 50a is registered, the movement history generating section 272 generates a movement history by using position information acquired while the valid user 209 is carrying the terminal device 200.

As illustrated in FIG. 11B and FIG. 11C, the feature information collecting section 274 acquires feature information at predetermined time intervals. Then, the verifying section 273 verifies the acquired feature information against the reference feature information 50a stored in the reference feature information storage section 283, and judges whether or not there is consistency between them.

That is, if there is consistency, it is judged that the valid user 209 is carrying the terminal device 200, and if there is not consistency, it is judged that an invalid user 208 is carrying the terminal device 200.

The movement history generating section 272 uses a result of the verification by the verifying section 273 to calculate a movement history.

Figure 12A:
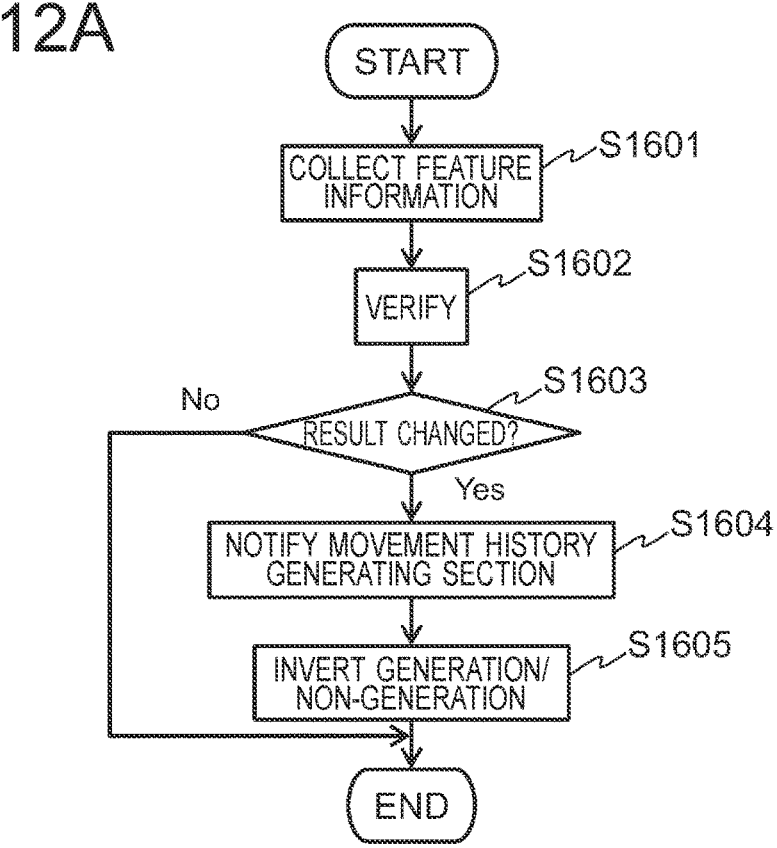
FIG. 12A and FIG. 12B are a flowchart and a timing chart of the movement history generation process in the first embodiment, respectively.

Hereinafter, the flow of the movement history generation process in the present embodiment is explained. FIG. 12A is the process flow of the movement history generation process in the present embodiment. The present process is executed at predetermined time intervals Δt. Note that during this process, the position determining section 271 collects position information at time intervals shorter than Δt, and stores the position information in the position information storage section 281 in association with times at which the position information is collected.

First, the feature information collecting section 274 collects feature information (Step S1601). Then, the verifying section 273 verifies the collected feature information against the reference feature information 50a stored in the reference feature information storage section 283 (Step S1602).

In a case where the collected feature information and the reference feature information 50a approximately match, and there is consistency between them, the verifying section 273 judges that the valid user 209 is carrying the terminal device 200. Then, the verification result is compared with the previous verification result, and it is judged whether or not there the verification result has changed (Step S1603). In a case where there has been a change from the previous verification result, a notification to that effect is given to the movement history generating section 272 (Step S1604).

Upon reception of the notification of the change in the verification result, the movement history generating section 272 inverts the state of generation of the movement history between the generated state and the non-generated state (Step S1605), stores the latest verification result, and ends the process. That is, if the movement history is being generated, the generation of the movement history is stopped, and if generation of the movement history has been stopped, the generation of the movement history is started.

In this manner, in the present embodiment, once it is judged that the valid user 209 is carrying the terminal device 200, the movement history generating section 272 continues generation of the movement history until the next time it is judged that the valid user 209 is not carrying the terminal device 200. In addition, once it is judged that the valid user 209 is not carrying the terminal device 200, generation of the movement history is stopped until the next time it is judged that the valid user 209 is carrying the terminal device 200. That is, as explained in relation to Step S1605 described above, in accordance with the inversion of the verification result, the state of generation of the movement history is inverted between the generated state and the non-generated state.

Figure 12B:
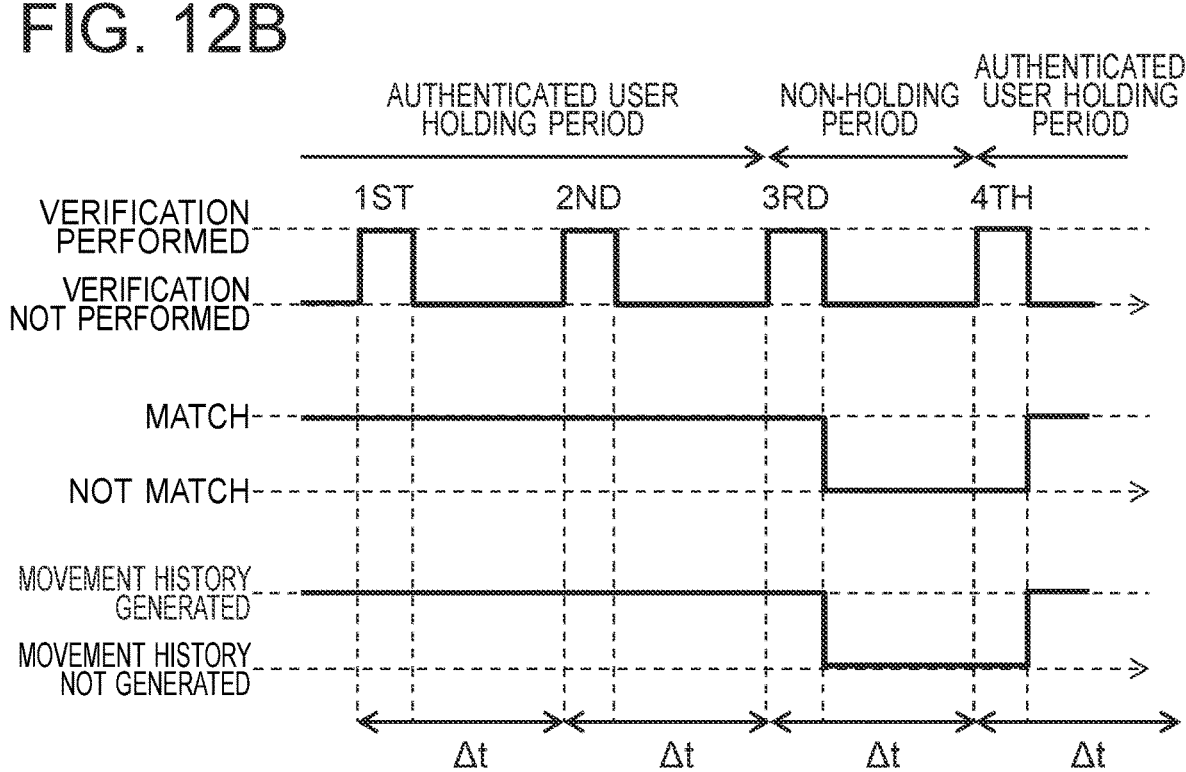

Such inversion of the state of generation of the movement history between the generated state and the non-generated state described above is explained by using a specific timing chart. FIG. 12B is a timing chart illustrating the timing of verification by the verifying section 273 (verification performed or verification not performed), results of the verification (match or not match) and how changes in the state of generation of a movement history between the generated state and the non-generated state occur.

As mentioned above, the verifying section 273 verifies the acquired feature information against the feature information for reference at the predetermined time intervals Δt. Then, in a case where there has been a change in the verification result, a notification is given to the movement history generating section 272.

In the example of FIG. 12B, the results of the first and second verification indicate that the acquired feature information matches the feature information, and there have been no changes from their previous verification results. Because of this, the verifying section 273 does not notify the verification results to the movement history generating section 272. Since the movement history generating section 272 does not receive a notification, the movement history generating section 272 remains in the same state with no changes. For example, in a case where the movement history generating section 272 is generating the movement history, the movement history generating section 272 continues the generation with no changes being made to the state. On the other hand, in a case where generation of the movement history has been stopped, the movement history generating section 272 remains in the stopped state with no changes.

Here, at the time of the third verification, the verification result indicates that the acquired feature information does not match the feature information for reference. In this case, since there has been a change to the verification result from the second verification result, which indicated that the acquired feature information matches the feature information for reference, the verifying section 273 gives the movement history generating section 272 a notification to that effect. The movement history generating section 272 receives the notification, and inverts the state. That is, in this case, generation of the movement history that has been performed up to that point is stopped.

At the time of the fourth verification, the verification result indicates that the acquired feature information matches the feature information for reference. In this case, since there has been a change to the verification result from the third verification result, which indicated that the acquired feature information does not match the feature information for reference, the verifying section 273 gives the movement history generating section 272 a notification to that effect. The movement history generating section 272 receives the notification, and inverts the state. That is, in this case, generation of the movement history that has been stopped up to that point is started.

In the example of FIG. 12B, it is judged that the valid user 209 is carrying the terminal device 200 until immediately before the third verification, and it is judged that the valid user 209 is not carrying the terminal device 200 from the third verification until immediately before the fourth verification.

In this manner, the movement history generating section 272 in the present embodiment generates the movement history from the position information only in a period during which it is judged that the valid user 209 is carrying the terminal device 200. Because of this, the movement history of the authenticated user, who is the valid user 209, can be collected highly precisely.

Figure 11D:
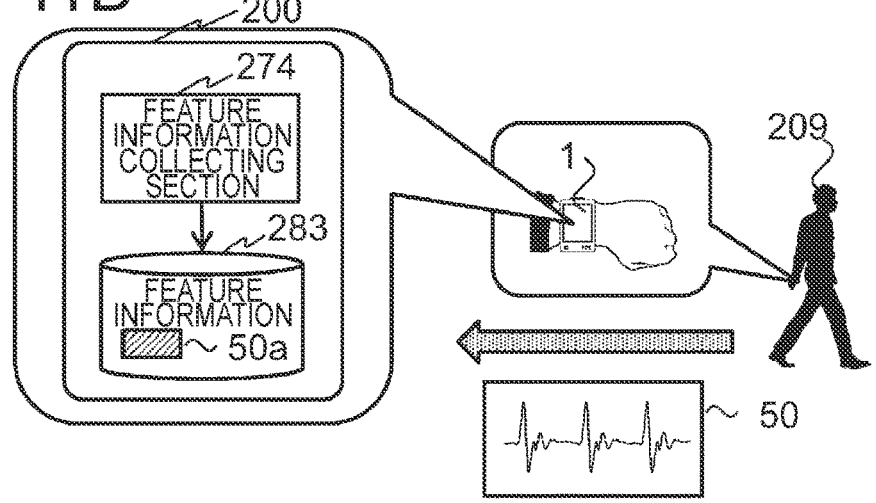

Note that although in the embodiment described above, information calculated from an output of the acceleration sensor 264 is used as the feature information, the feature information is not limited to this. For example, in a case where the terminal device 200 is a wristwatch type device, the feature information may be pulse wave signals, for example, as illustrated in FIG. 11D. The pulse wave signals are acquired by a pulse wave sensor which is included as the biometric information sensor 267, for example.

As explained above, according to the present embodiment, a movement history itself which is generated from position information, and preregistered by the user 209 is used for a personal authentication of the user 209. Because of this, a personal authentication can be performed by using information unique to a holder of the terminal. In addition, since there are no such processes as generation of inquiries or answering the inquiries, a burden on the side of the personal authentication apparatus 310 is also reduced, and a burden on the user 209 who operates the terminal device 200, and cumbersome tasks that the user 209 are required to perform are also reduced.

In addition, the movement history is registered with the personal authentication apparatus 310 in association with the identification information (terminal ID) of the terminal device 200. Because of this, even if only the movement history information is copied, and transmitted from another terminal, for example, an authentication does not succeed. Because of this, the safety is high.

In addition, the movement history is generated by using the position information collected in a period during which it is concluded that the valid user 209 is carrying the terminal device 200. Accordingly, the reliability of the movement history to be used for a personal authentication is high.

In addition, generation of the movement history is performed continuously, and the movement history registered with the personal authentication apparatus 310 as the authentication information is updated at predetermined timings. Because of this, a system highly resistant to leaks of authentication information can be provided.

In addition, in the embodiment described above, in particular, the updating of authentication information is performed at the shop device 330 after authentications. Accordingly, data transmission and reception at the time of the updating is performed through inter-terminal communication. As compared to transmission and reception via general networks, inter-terminal communication is highly safe. Since the updating of authentication information is performed by using such highly safe communication, the safety of the whole system is also high.

In this manner, in the present embodiment, a personal authentication is performed by using a movement history generated from position information which is probably position information of the authenticated user. In addition, the movement history is registered in advance with the personal authentication apparatus 310 along with information identifying the terminal device 200. Furthermore, the authentication information is updated at predetermined timings. With these processes, according to the present embodiment, a system that simultaneously achieves both safety and convenience can be realized.

Note that although in the configuration in the present embodiment, the updating of a movement history is performed by using the shop device 330 after a personal authentication is performed at a shop, this is not the sole example. For example, in a possible configuration, authentication information is transmitted to the personal authentication apparatus 310 via the network 101, and the movement history is updated at predetermined timings. The predetermined timings may be, for example, "at predetermined time intervals," "every time a predetermined amount of movement histories is generated," or the like. In this case, at the time of the transmission, predetermined security measures such as encryption are taken.

In addition, a movement history may be generated every time the amount of position information accumulated while the valid user 209 is carrying the terminal device 200 (valid position information) reaches a predetermined amount. In this case, only the latest movement history may be stored as the movement history for updating.

In addition, in a case where movement histories are generated irregularly when inter-terminal communication with the shop device 330 is possible as mentioned above, it may be ensured that there is a predetermined amount of valid position information by including therein position information used at the time of the previous movement history generation. For example, such cases include a case where the period of time that has elapsed since the time of the previous movement history generation is so short that a sufficient amount of valid position information has not been accumulated, and other cases. In addition, in a case where a sufficient amount of valid position information has not been accumulated, a new movement history may not be generated, and a movement history in the authentication information stored in the personal authentication apparatus 310 may not be updated.

In addition, although in the embodiment described above, the terminal ID is transmitted as the authentication information along with the movement history, and the terminal ID 1a is also stored in the personal authentication apparatus 310, this is not the sole example. Only the movement history may be stored in the authentication information storing section 314 of the personal authentication apparatus 310. In this case, regardless of the sender terminal device 200, the authenticating section 313 may judge that an authentication is successful as long as the transmitted movement history is stored in the authentication information storing section 314.

Second Embodiment

Next, a second embodiment of the present invention is explained. In the first embodiment, the personal authentication apparatus is provided independently of each shop. In contrast to this, in the present embodiment, the personal authentication apparatus is provided for each shop or for each shop group. Then, authentication information used for a personal authentication is distributed and shared among a plurality of personal authentication apparatuses.

In the following explanation, focus is given to configurations of a personal authentication system 102 in the present embodiment that are different from those in the first embodiment.

Figure 13:
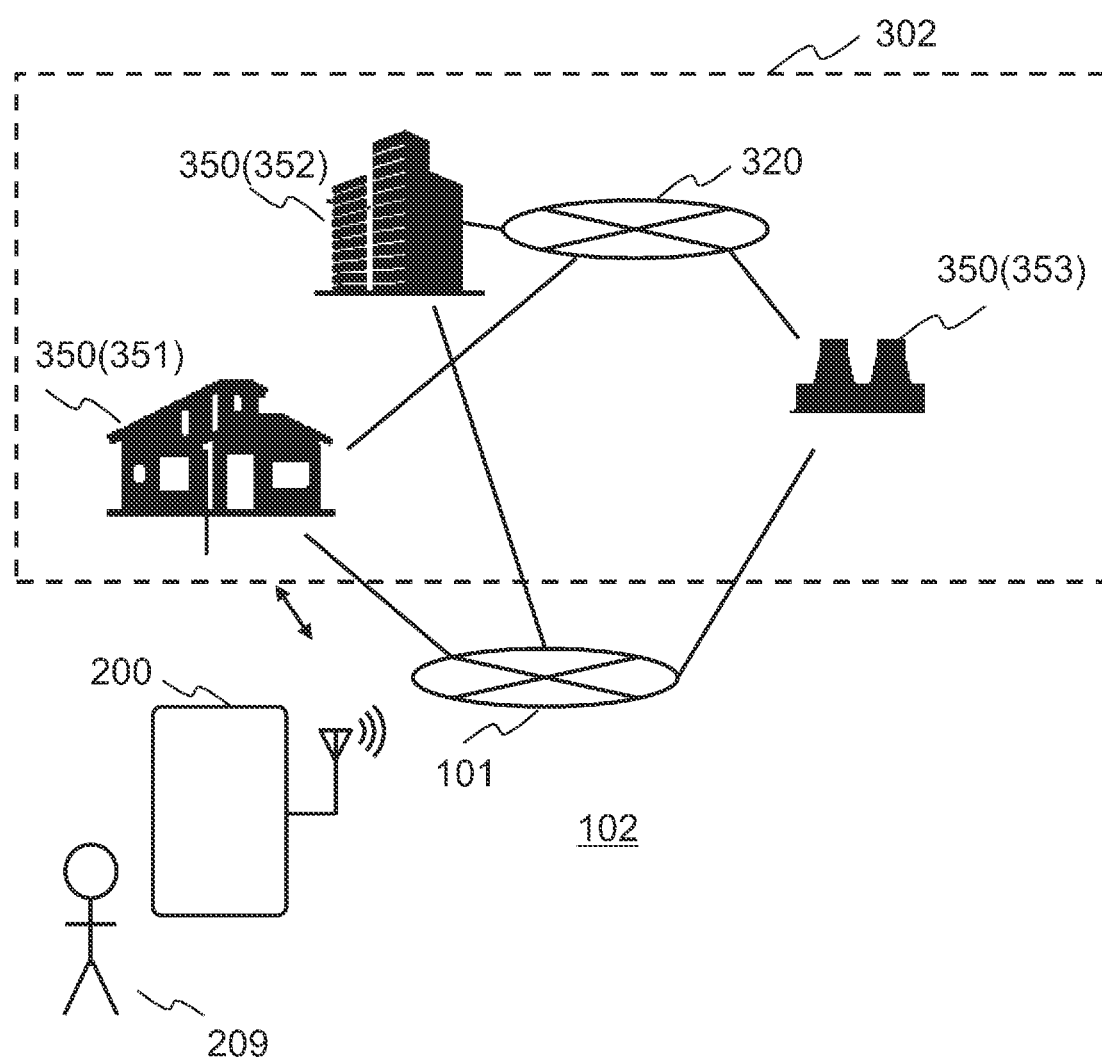
FIG. 13 is an overall configuration diagram of a personal authentication system in a second embodiment.

The overall configuration of the personal authentication system 102 in the present embodiment is illustrated in FIG. 13. The personal authentication system 102 in the present embodiment includes the terminal device 200 and a provider system 302. Then, the provider system 302 includes personal authentication apparatuses 350 (351, 352 and 353) that are arranged for individual shops. The individual personal authentication apparatuses 350 are connected by the internal network 320. Note that unless it is particularly necessary to distinguish between the individual personal authentication apparatuses 351, 352 and 353, the personal authentication apparatuses 351, 352 and 353 are representatively referred to as the personal authentication apparatus 350.

Since the terminal device 200 in the present embodiment basically has similar configurations to those of the terminal device 200 in the first embodiment, explanations thereof are omitted here.

Figure 14A:
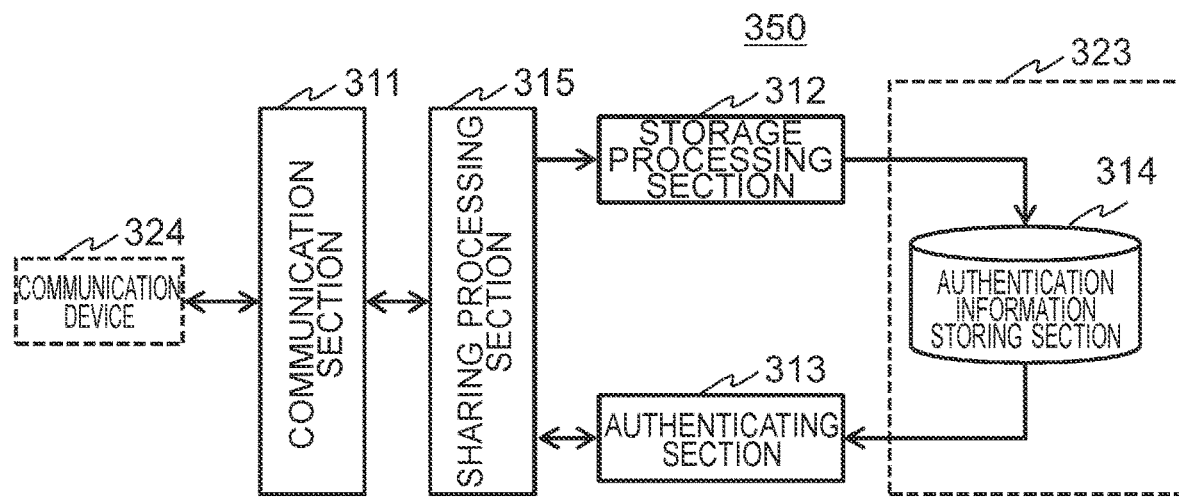
FIG. 14A and FIG. 14B are a functional block diagram and a hardware configuration diagram of the personal authentication apparatus in the second embodiment, respectively.

FIG. 14A is a functional block diagram of the personal authentication apparatus 350 in the present embodiment. In addition, FIG. 14B is a hardware configuration diagram of the personal authentication apparatus 350 in the present embodiment.

Figure 14B:
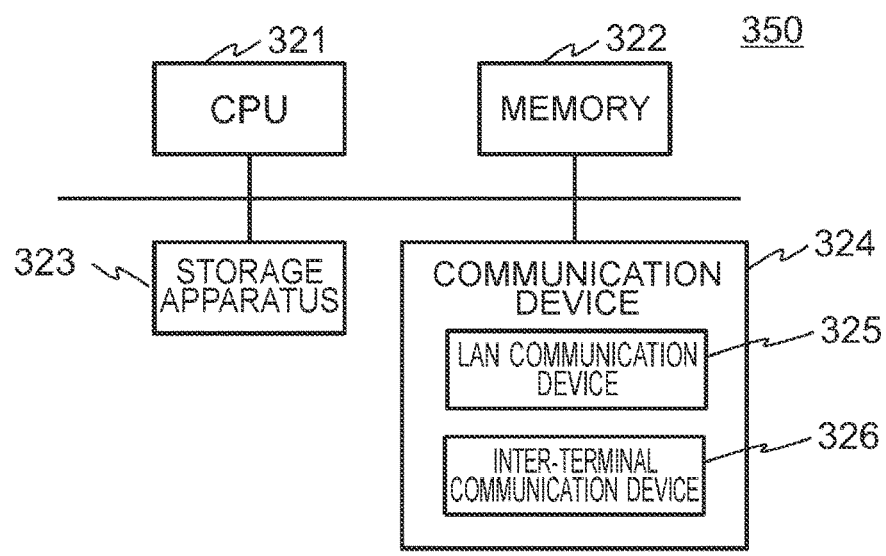

As illustrated in FIG. 14B, the personal authentication apparatus 350 in the present embodiment includes an inter-terminal communication device 326 in addition to the configurations of the personal authentication apparatus 310 in the first embodiment. The inter-terminal communication device 326 has similar configurations to those of the apparatus with the same name provided to the terminal device 200. In the present embodiment, the inter-terminal communication device 326 is used for performing data transmission and reception with the terminal device 200 at a shop.

In addition, as illustrated in FIG. 14A, the personal authentication apparatus 350 in the present embodiment includes a sharing processing section 315 in addition to similar functional configurations to those in the first embodiment.

In the present embodiment, a plurality of the personal authentication apparatuses 350 are provided as mentioned above. Then, all the personal authentication apparatuses 350 share authentication information. In addition, in the present embodiment, an authentication for one authentication request is performed by the plurality of personal authentication apparatuses 350. Then, in a case where the ratio of personal authentication apparatuses 350 that judged that the authentication is successful to the total number of the personal authentication apparatuses 350 is equal to or greater than a predetermined ratio, e.g. 50%, it is concluded as the whole system that the authentication is successful.

In order to realize this, at the sharing processing section 315, the communication section 311 judges whether or not received authentication information is registration authentication information, and then judges the sender of the authentication information. Here, it is judged whether the sender is the terminal device 200 or another personal authentication apparatus 350. Whether the sender is the terminal device 200 or another personal authentication apparatus 350 is judged on the basis of header information of the transmitted/received data or the like, for example.

Then, in a case where the sender of the received authentication information or registration authentication information is the terminal device 200, the sharing processing section 315 not only delivers the received authentication information or registration authentication information to the storage processing section 312 or the authenticating section 313, but also instructs the communication section 311 to transmit the received authentication information or registration authentication information also to all the other personal authentication apparatuses 350. On the other hand, in a case where the sender of the received authentication information or registration authentication information is another personal authentication apparatus 350, similarly to the first embodiment, the sharing processing section 315 delivers the received authentication information or registration authentication information to the storage processing section 312 or the authenticating section 313 in accordance with a result of judgement whether or not the authentication information is the registration authentication information.

Furthermore, in a case where the authentication information is received from another personal authentication apparatus 350, the sharing processing section 315 causes the authenticating section 313 to perform an authentication, and additionally causes the communication section 311 to transmit a result of the authentication to the sender personal authentication apparatus 350.

In addition, upon reception of authentication results from other personal authentication apparatuses 350 via the communication section 311, the sharing processing section 315 adds a result of an authentication by the authenticating section 313 of the personal authentication apparatus 350 to which the sharing processing section 315 is provided, and judges whether or not the ratio of personal authentication apparatuses 350 that judged that the authentication is successful is equal to or greater than 50%. Then, if the ratio of the personal authentication apparatuses 350 that judged that the authentication is successful is equal to or greater than 50%, it is judged that the authentication is successful, and the communication section 311 is caused to transmit the judgement result to the sender terminal device 200. On the other hand, in a case where the ratio of the personal authentication apparatuses 350 that judged that the authentication is successful is lower than 50%, it is judged that the authentication failed, and the communication section 311 is caused to transmit the judgement result to the sender terminal device 200.

Hereinafter, the flow of the personal authentication process in the present embodiment is explained.

Note that similarly to the first embodiment, in the present embodiment also, first, the terminal device 200 performs the initial registration process of registering authentication information with the personal authentication apparatus 350. Similarly to the first embodiment, the initial registration process is performed by transmitting registration authentication information to any of the personal authentication apparatuses 350 via the network 101.

At this time, the personal authentication apparatus 350 having received the registration authentication information not only stores the received authentication information (the movement history 5a and the terminal ID 1a) in the authentication information storing section 314 of itself, but also transmits the received authentication information to other personal authentication apparatuses 350. Then, at the other personal authentication apparatuses 350 also, the received registration authentication information is stored in the authentication information storing sections 314.

Thereby, the registration authentication information (the movement history 5a and the terminal ID 1a) of the terminal device 200 is shared among all the personal authentication apparatuses 350.

The flow of data at the time of an authentication in the present embodiment is explained by using FIG. 15. As illustrated in this figure, in a case where the user 209 carrying the terminal device 200 visits a particular shop, and requests an authentication to the personal authentication apparatus 352, that is, in a case where an authentication request is received from the terminal device 200, the personal authentication apparatus 352 performs an authentication in itself.

In addition, the personal authentication apparatus 352 transmits the authentication information (the movement history 5a and the terminal ID 1a) to the other personal authentication apparatuses 351 and 353 via the internal network 320. The other personal authentication apparatuses 351 and 353 individually perform authentications, and reply to the sender personal authentication apparatus 352 with results of the authentications via the internal network 320.

The personal authentication apparatus 352 determines a final authentication result by using the result of the authentication by itself, and the authentication results received from the other personal authentication apparatuses 351 and 353, and replies to the requester terminal device 200 with the final authentication result.

Note that in the present embodiment, the initial registration process may be performed by using inter-terminal communication at a particular shop having the personal authentication apparatus 350. With a configuration like this, authentication information used at the time of the initial registration process is transmitted and received through inter-terminal communication. Thereby, the safety becomes still higher.

According to the present embodiment, the plurality of personal authentication apparatuses 350 having similar configurations to those in the first embodiment are provided. Because of this, according to the present embodiment, similar effects to those in the first embodiment can be attained. Furthermore, in the present embodiment, the plurality of personal authentication apparatuses 350 are provided, and authentication information is shared among the plurality of personal authentication apparatuses 350. Thereby, an attempt is made to reach a consensus among the plurality of apparatuses at the time of an authentication, and mutual examinations are performed. Accordingly, the reliability is enhanced.

Note that in the present embodiment, in a case where the ratio of personal authentication apparatuses 350 that judged that the authentication is successful is equal to or greater than 50%, it is judged that the authentication is successful. However, the ratio of personal authentication apparatuses 350 judging that an authentication is successful which is required for a judgement of successful authentication is not limited to this but can be set freely. For example, in a possible configuration, it is judged that an authentication is successful only in a case where all the personal authentication apparatuses 350 judge that the authentication is successful.

In addition, although in the example explained in the embodiment described above, the personal authentication apparatuses 350 are arranged for individual shops, the present configuration is not the sole configuration. The personal authentication apparatuses 350 may be arranged for individual groups each including several shops, for example.

In addition, various modification examples of the first embodiment can also be applied to the present embodiment.

Third Embodiment

Next, a third embodiment of the present invention is explained. In the present embodiment, third party position information is used for examining the validity of a movement history.

In the present embodiment, as the third party position information, position information of a base station 105 in a mobile phone network is used, for example. In the following explanation, focus is given to configurations in the present embodiment that are different from those in the first embodiment.

The overall configuration of the personal authentication system 100 in the present embodiment is basically the same as that in the first embodiment. In addition, the hardware configuration and functional blocks of each constituent element are also basically the same as those in the first embodiment. It should be noted, however, that the terminal device 200 includes a configuration that acquires the third party position information. In addition, the personal authentication apparatus 310 includes a configuration that judges the validity of the third party position information.

Figure 16A:
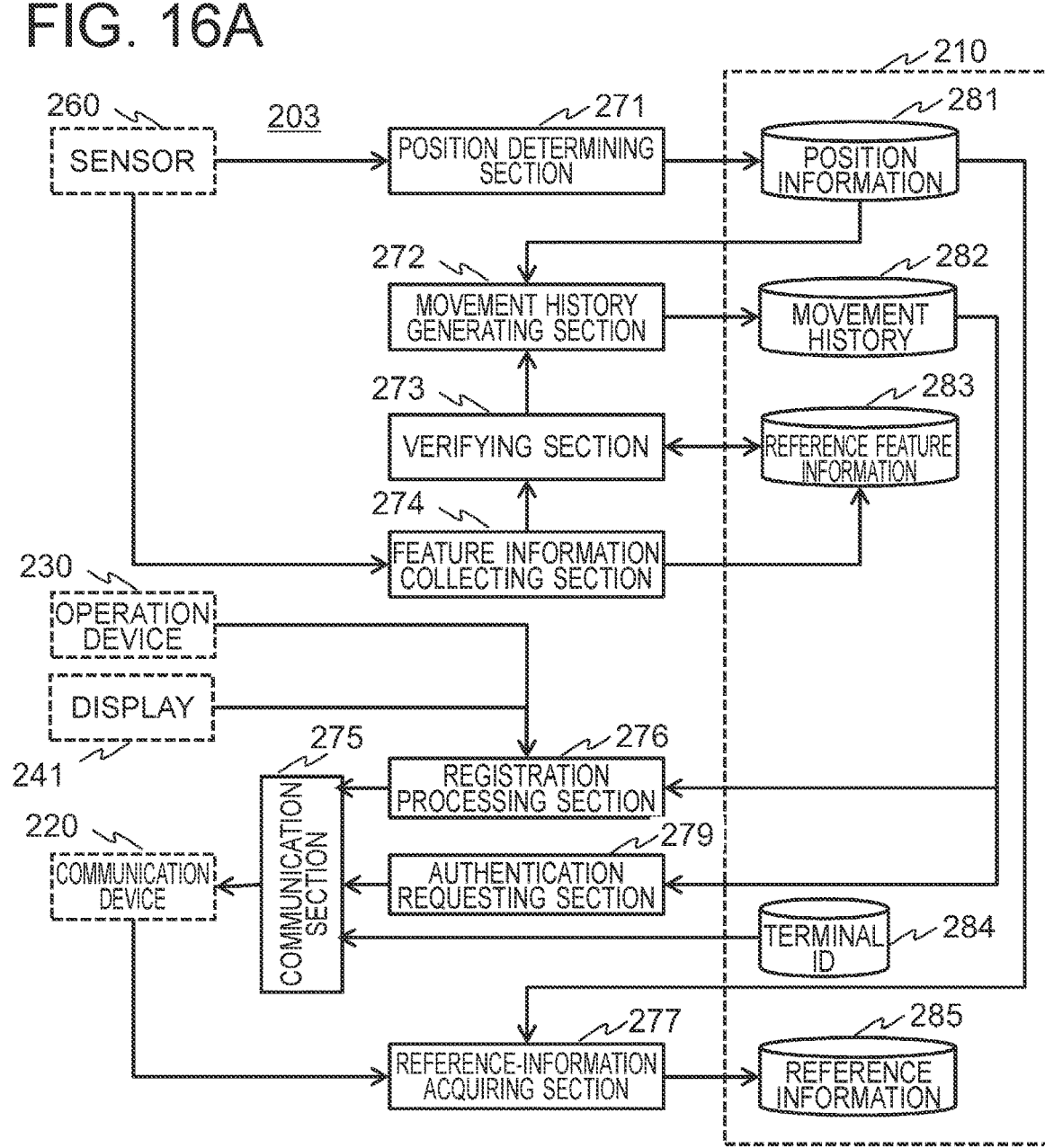
FIG. 16A is a functional block diagram of the terminal device in a third embodiment.

FIG. 16A is a functional block of a terminal device 203 in the present embodiment. As illustrated in this figure, the terminal device 203 in the present embodiment includes a reference information acquiring section 277 in addition to the configurations in the first embodiment. The reference information acquiring section 277 acquires reference position information at the timing when the position determining section 271 acquires position information, and stores the position information in the position information storage section 281. Then, in association with the position information that the position determining section 271 acquired at the same timing, the reference information acquiring section 277 stores the reference position information in the reference information storage section 285 as the reference information.

In the present embodiment, the reference position information acquired by the reference information acquiring section 277 may be information of the base station 105 as mentioned above, for example.

Via the telephone network communication device 222 in the communication device 220, the reference information acquiring section 277 acquires, as the reference position information, the information of the base station 105 used at the time of communication. For example, the acquired reference position information may be position information itself of the base station 105, or may be identification information (a base station ID) identifying the base station.

Figure 17A:
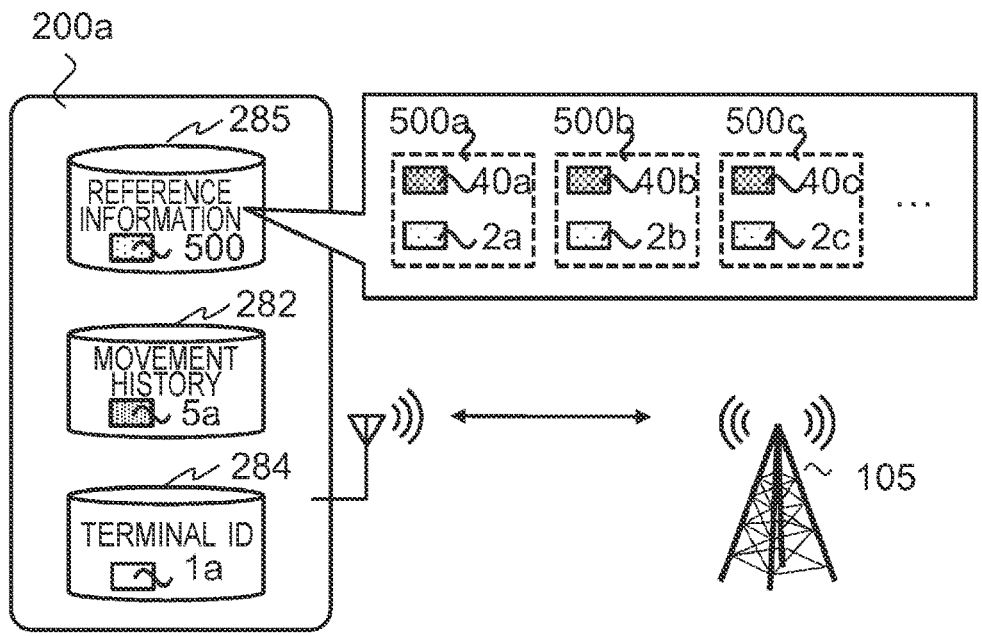
FIG. 17A is an explanatory diagram for explaining a reference information acquisition process in the third embodiment.

As illustrated in FIG. 17A, the reference information acquiring section 277 stores, as reference information 500*a* in the reference information storage section 285, a pair of position information 2*a* and reference position information 40*a* that are acquired at the same timing.

Note that generation of the reference information 500 is repeated at predetermined timings. Accordingly, a plurality of pieces of the reference information 500 including position information 2 and reference position information 40 is generated, and stored in the reference information storage section 285. In the example illustrated here, reference information 500*a* (40*a* and 2*a*), reference information 500*b* (40*b* and 2*b*), and reference information 500*c* (40*c* and 2*c*) are registered.

Figure 17B:
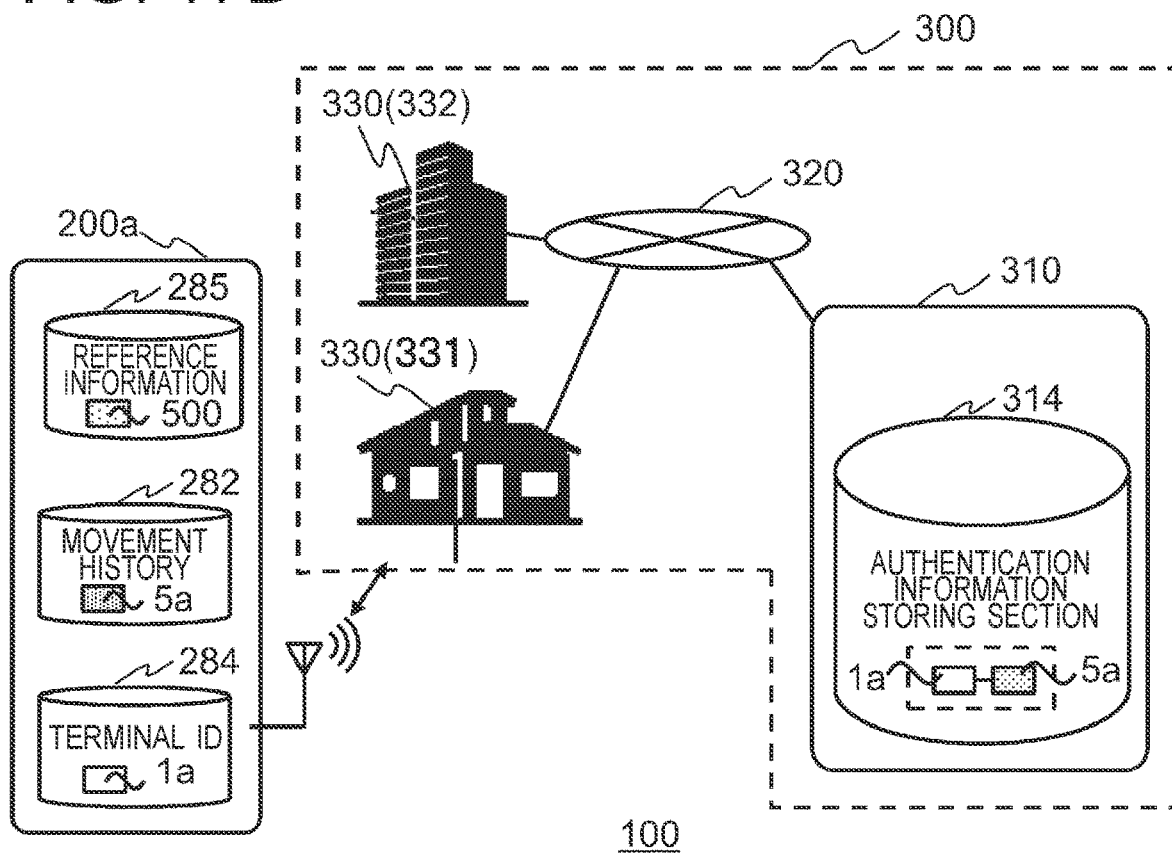
FIG. 17B which is an explanatory diagram for explaining an authentication process in the third embodiment, respectively.

In the present embodiment, at the time of an authentication, as illustrated in FIG. 17B, the authentication requesting section 279 transmits the reference information 500 to the shop device 330 in addition to the authentication information (the movement history 5*a* and the terminal ID 1*a*) in the first embodiment. Then, the shop device 330 transmits the received authentication information and the reference information 500 to the personal authentication apparatus 310.

Figure 16B:
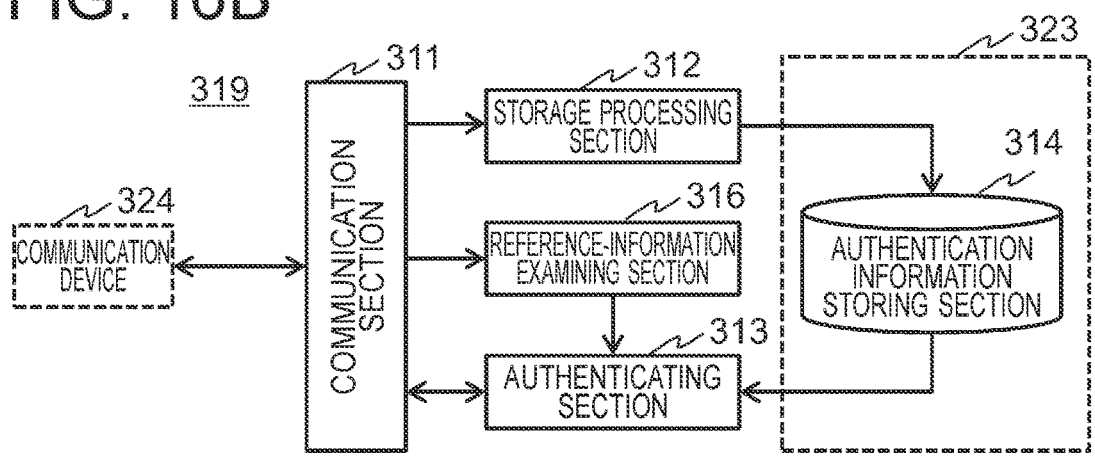
FIG. 16B is a functional block diagram of the personal authentication apparatus in the third embodiment.

In addition, as illustrated in FIG. 16B, the personal authentication apparatus 319 in the present embodiment further includes a reference information examining section 316 in addition to the configurations in the first embodiment. The reference information examining section 316 examines the validity of the reference information 500.

That is, the reference information examining section 316 examines whether the relationship between the position information 2 in the received reference information 500 and the reference position information 40 registered in association therewith is a reasonable relationship. For example, in a case where the reference position information 40*a* is the position information of the base station 105, it is examined whether the position information 2*a* is within the coverage area of the base station 105 identified with the reference position information 40*a*.

Note that in a case where the reference position information 40*a* is a base station ID of the base station 105, it is examined whether the position information 2*a* is within the coverage area of the base station 105 identified with the ID.

Note that information about correspondence between the coverage area, and the position information and/or base station ID or the like of each base station 105 may be available at the personal authentication apparatus 310.

Then, only in a case where a result of the reference information examination indicates that the position information 2*a* is within the coverage area, the personal authentication may be judged as being successful.

Figure 18:
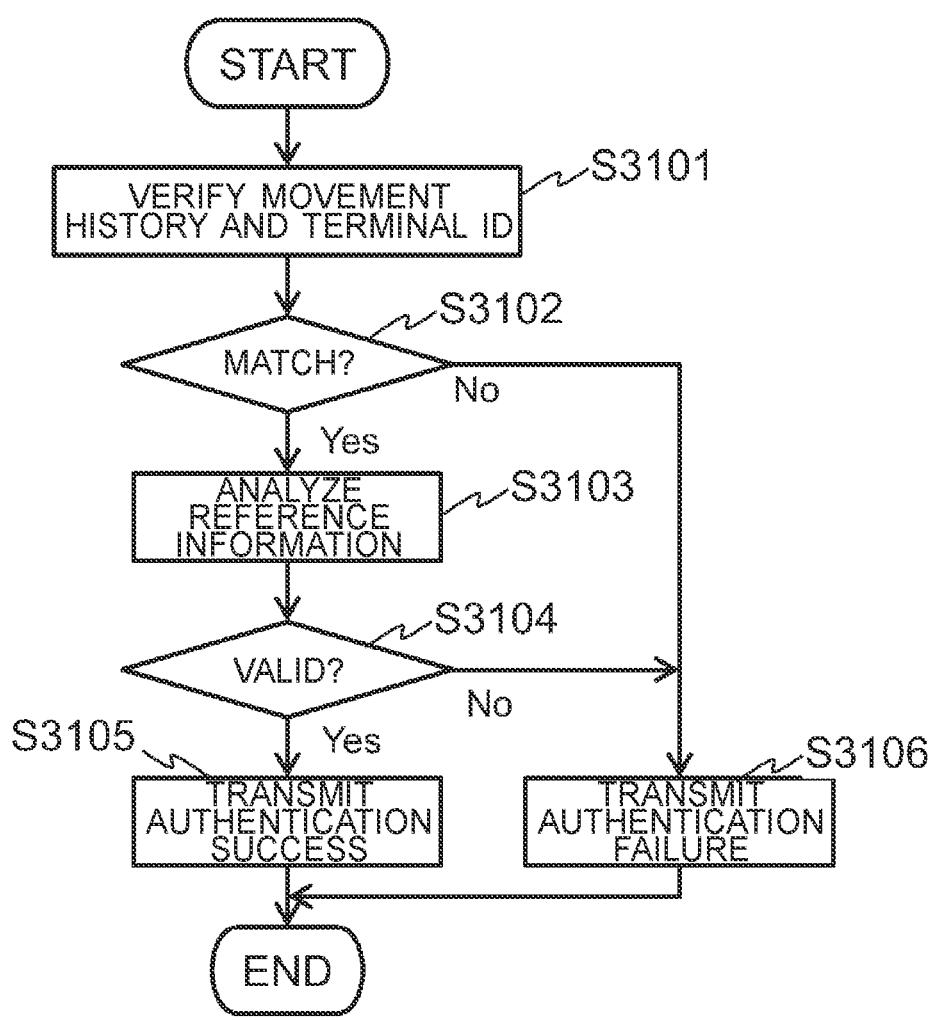
FIG. 18 is a flowchart of the authentication process in the third embodiment.

The flow of the authentication process in the personal authentication apparatus 310 in the present embodiment is explained along FIG. 18.

First, similarly to the first embodiment, the authenticating section 313 verifies received authentication information against the authentication information stored in the authentication information storing section 314 (Step S3101).

Then, in a case where the received authentication information and the stored authentication information do not match, it is judged that the authentication failed, a reply is made to the sender terminal device 200 with information meaning that the authentication failed (Step S3106), and the process ends.

On the other hand, in a case where the received authentication information and the stored authentication information match, the reference information examining section 316 analyzes each piece of the reference information 500, and examines its validity (Step S3103). Here, as mentioned above, it is judged whether or not the position information 2 is within the coverage area of the base station 105 identified with the reference position information 40. Then, if the positions indicated by all the pieces of the reference information 500 are within the coverage area, those pieces of the reference information are judged as being valid (Step S3104).

In a case where the reference information 500 is judged as being valid at Step S3104, a reply is made to the sender terminal device 200 with information meaning that the authentication is successful (Step S3105), and the process ends.

On the other hand, in a case where the reference information 500 is not judged as being valid, the process proceeds to Step S3106.

Note that although in the present embodiment, the position information of the base station 105 of a mobile phone is used as the reference information, the reference information is not limited to this. The reference information may be any information such as position information of other landmarks as long as the information can be acquired by the terminal device 200 and the validity of the information can be judged by the personal authentication apparatus 310.

In the present embodiment, the terminal device 200 and the personal authentication apparatus 310 each have similar configurations to those in the first embodiment. Because of this, similar effects to those in the first embodiment can be attained. Furthermore, the terminal device 200 in the present embodiment collects the reference information, and transmits the reference information to the personal authentication apparatus 310 along with the authentication information. Then, at the personal authentication apparatus 310, the validity of the reference information is judged as well. As the reference information, third party position information is used, for example.

Because of this, according to the present embodiment, it is possible to judge whether a movement history transmitted from the terminal device 200 is one actually obtained as a result of movements of the user 209 or is a fake. Accordingly, the reliability can further be enhanced.

In addition, various modification examples of the first embodiment can be applied also to the present embodiment.

Although in the embodiment described above, the authentication information is generated from the position information acquired by the position determining section 271, the authentication information is not limited to this. For example, purchase histories and the like may be used. The purchase histories may include information about shops of purchase, information about purchased items, information about an amount of money of purchase, and the like, for example.

Note that the present invention is not limited to the embodiments described above, and includes various modification examples. For example, the embodiments described above are explained in detail in order to explain the present invention in an easy-to-understand manner, and embodiments are not necessarily limited to ones including all the configurations that are explained. In addition, some of the configurations of an embodiment can be replaced with configurations of another embodiment, and configurations of an embodiment can also be added to the configurations of another embodiment. In addition, some of the configurations of each embodiment can be subjected to addition, deletion, or replacement of other configurations.

In addition, each configuration, function, processing section, processing means, or the like described above may be partially or entirely realized by hardware for example by designing it in an integrated circuit or by other means.

In addition, control lines and information lines illustrated are only ones that are deemed to be necessary for the explanations, and all control lines and information lines that are required for a product are not necessarily illustrated. It may be considered that almost all configurations are actually connected to each other.

REFERENCE SIGNS LIST

1a . . . terminal ID,
2 . . . position information,
2a . . . position information,
4a . . . position information,
4b . . . position information,
5a . . . movement history,
5b . . . movement history,
40 . . . reference position information,
40a . . . reference position information,
50a . . . reference feature information,
100 . . . personal authentication system,
101 . . . network,
102 . . . personal authentication system,
105 . . . base station,
200 . . . terminal device,
201 . . . CPU,
202 . . . system bus,
203 . . . terminal device,
208 . . . invalid user,
209 . . . valid user,
210 . . . storage apparatus,
211 . . . ROM,
212 . . . RAM,
213 . . . external memory I/F,
220 . . . communication device,
221 . . . LAN communication device,
222 . . . telephone network communication device,
223 . . . inter-terminal communication device,
227 . . . expansion I/F,
230 . . . operation device,
240 . . . video processor,
241 . . . display,
242 . . . image signal processor,
243 . . . camera,
246 . . . inter-terminal communication device,
250 . . . audio processor,
251 . . . speaker,
252 . . . audio signal processor,
253 . . . microphone,
260 . . . sensor,
261 . . . GPS receiving device,
262 . . . gyro sensor,
263 . . . geomagnetic sensor,
264 . . . acceleration sensor,
265 . . . illuminance sensor,
266 . . . proximity sensor,
267 . . . biometric information sensor,
271 . . . position determining section,
272 . . . movement history generating section,
273 . . . verifying section,
274 . . . feature information collecting section,
275 . . . communication section,
276 . . . registration processing section,
277 . . . reference information acquiring section,
279 . . . authentication requesting section,
281 . . . position information storage section,
282 . . . movement history storage section,
283 . . . reference feature information storage section,
284 . . . terminal ID storage section,
285 . . . reference information storage section,
300 . . . provider system,
302 . . . provider system,
310 . . . personal authentication apparatus,
311 . . . communication section,
312 . . . storage processing section,
313 . . . authenticating section,
314 . . . authentication information storing section,
315 . . . sharing processing section,
316 . . . reference information examining section,
319 . . . personal authentication apparatus,
320 . . . internal network,
321 . . . CPU,
322 . . . memory,
323 . . . storage apparatus,
324 . . . communication device,
325 . . . LAN communication device,
326 . . . inter-terminal communication device,
330 . . . shop device,
331 . . . shop device,
332 . . . shop device,
333 . . . shop device,
334 . . . shop device,
340 . . . LAN communication device,
341 . . . CPU,
342 . . . memory,
343 . . . storage apparatus,
344 . . . communication device,
345 . . . LAN communication device,
346 . . . inter-terminal communication device,
350 . . . personal authentication apparatus,
351 . . . personal authentication apparatus,
352 . . . personal authentication apparatus,
353 . . . personal authentication apparatus,
411 . . . model name information,
412 . . . serial number,
422 . . . date and time,
423 . . . position information,
431 . . . pace frequency,
432 . . . stride,
433 . . . walking speed,
500 . . . reference information,
500a . . . reference information,
500b . . . reference information,
500c . . . reference information

The invention claimed is:

1. A mobile terminal comprising:
a GPS sensor;
a wireless communication interface to communicate with a network; and
a controller;
wherein the controller is configured to:
obtain and accumulate a position information of the mobile terminal using the GPS sensor and/or the wireless communication interface at predetermined time intervals,
generate a movement history information using a plurality of the position information, store the movement history information into a storage, transmit a registration request which includes the movement history information stored into the storage to an authentication server on the network at an initial registration process, transmit an authentication request at an authentication process, the authentication request including the movement history information stored into the storage and transmitted to the authentication server included in the registration request;

transmit to the authentication server terminal identification information uniquely identifying the mobile terminal along with the movement history information in the registration request, transmit to the authentication server the terminal identification information and the movement history information in the authentication request;

collect feature information indicating a feature of a user of the mobile terminal, verify the collected feature information against reference feature information which is feature information of a valid user held in advance, and output a verification result, and generate the movement history by using position information indicating a position determined while the verification result is output as an information indicating that the feature information and the reference feature information match.

2. The mobile terminal according to claim 1,
wherein the controller is further configured to
transmit the latest movement history information to the authentication server after a successful authentication in response to the authentication request.

3. The mobile terminal according to claim 1, wherein the controller is further configured to
acquire third party position information as reference information, and
transmit to the authentication server the reference information in the authentication request.

4. The mobile terminal according to claim 1,
wherein the controller is further configured to
communicate the authentication request using near field communication.

5. The mobile terminal according to claim 1, further comprising an acceleration sensor that senses an acceleration of the mobile terminal,
wherein an output of the acceleration sensor in a predetermined period is used as the feature information.

6. The mobile terminal according to claim 1, further comprising a pulse wave sensor that senses pulse waves of the user, wherein an output of the pulse wave sensor in a predetermined period is used as the feature information.

* * * * *